United States Patent
Manuel et al.

(10) Patent No.: US 10,537,796 B2
(45) Date of Patent: Jan. 21, 2020

(54) COLLAPSIBLE VIRTUAL REALITY HEADSET

(71) Applicant: Samsung Electronics Company, Ltd., Suwon, Gyeong gi-Do (KR)

(72) Inventors: Steven Manuel, San Mateo, CA (US); Jody Fu, Mountain View, CA (US); Curtis Aumiller, San Jose, CA (US); Chengyuan Wei, Sunnyvale, CA (US)

(73) Assignee: Samsung Electronics Company, Ltd., Suwon (KR)

( * ) Notice: Subject to any disclaimer, the term of this patent is extended or adjusted under 35 U.S.C. 154(b) by 267 days.

(21) Appl. No.: 15/496,638

(22) Filed: Apr. 25, 2017

(65) Prior Publication Data

US 2017/0304721 A1 Oct. 26, 2017

Related U.S. Application Data

(60) Provisional application No. 62/327,948, filed on Apr. 26, 2016, provisional application No. 62/460,627, filed on Feb. 17, 2017.

(51) Int. Cl.
*A63F 13/25* (2014.01)

(52) U.S. Cl.
CPC ...... *A63F 13/25* (2014.09); *A63F 2300/8082* (2013.01)

(58) Field of Classification Search
CPC . G02B 27/22; G02B 27/2257; G02B 27/2228

USPC .......... 359/462, 466, 474, 476, 477
See application file for complete search history.

(56) References Cited

U.S. PATENT DOCUMENTS

| | | | |
|---|---|---|---|
| 9,049,357 B2 * | 6/2015 | Schmidt | G03B 13/02 |
| 2005/0174647 A1 * | 8/2005 | Fischbach | G02B 23/16 |
| | | | 359/600 |
| 2013/0271902 A1 * | 10/2013 | Lai | H04R 1/02 |
| | | | 361/679.01 |
| 2017/0011716 A1 | 1/2017 | Hoellwarth | |

FOREIGN PATENT DOCUMENTS

| | | |
|---|---|---|
| CN | 204832682 U | 12/2015 |
| CN | 204832685 U * | 12/2015 |
| CN | 204832685 U | 12/2015 |
| CN | 106033145 A | 10/2016 |
| CN | 205942095 U | 2/2017 |
| CN | 205958838 U | 2/2017 |
| KR | 2016-0108120 A | 9/2016 |

\* cited by examiner

*Primary Examiner* — Robert E. Tallman
(74) *Attorney, Agent, or Firm* — Baker Botts L.L.P.

(57) ABSTRACT

An apparatus for viewing virtual reality content is discussed in the present application. The apparatus may include a collapsible body and a pair of collapsible hood elements that are coupled to the body. The body may include a pair of lenses. Each of the hood elements may be collapsible into or onto the body. In a collapsed configuration of the apparatus, the hood elements may be collapsed into or onto the body, and a combined body structure that includes the body and the collapsed hood elements may be collapsed into or onto itself.

30 Claims, 20 Drawing Sheets

COLLAPSIBLE VIRTUAL REALITY HEADSET

RELATED APPLICATION

This application claims the benefit, under 35 U.S.C. § 119(e), of U.S. Provisional Patent Application No. 62/327,948 filed Apr. 26, 2016, which is incorporated herein by reference. This application further claims the benefit, under 35 U.S.C. § 119(e), of U.S. Provisional Patent Application No. 62/460,627 filed Feb. 17, 2017, which is incorporated herein by reference

TECHNICAL FIELD

This disclosure generally relates to portable virtual reality headsets.

BACKGROUND

Virtual reality (VR) is a computer technology for generating realistic images, sounds, and other sensations that replicate a real environment or for creating an imaginary environment for a user. The user may experience virtual reality using a VR headset. Nowadays VR headsets are widely used in games and for viewing digital content, such as videos, photos, short clips, etc. Traditional VR headsets comprise a stereoscopic head-mounted display (providing separate images for each eye), stereo sound, and head motion tracking sensors, which may include gyroscopes, accelerometers, etc. Some VR headsets also have eye tracking sensors and gaming controllers.

These traditional head-mounted display type VR headsets are typically big, bulky, expensive, and are not very portable. In the past few years, there have been some simplified versions of the traditional VR headsets where an external device may be incorporated and used with a headset. These simplified headsets by themselves contain very minimal components and the external device components are instead used to achieve the same functions. For example, the external device may be a smartphone having a split-display (for providing separate images for each eye), stereo sound, head motion tracking sensors, and eye tracking sensors. Even though the VR headsets have been simplified, they still lack the robustness and the portability to carry the headsets around and use on the go. By way of an example, most of the current headset designs do not allow a user to fold/collapse a headset when not in use in an efficient way and carry the headset in a pocket. Even when they offer collapsibility and/or the possibility to carry in a pocket, conventional headsets typically provide a poor viewing experience and typically suffer from reduced image quality.

BRIEF DESCRIPTION OF THE DRAWINGS

FIGS. 5A-5C illustrate example tabs for attaching a mobile device with the VR headset. FIG. 5D illustrates an example clip for attaching a mobile device with the headset. FIG. 5E illustrates an example view of the headset with the clip attached.

DESCRIPTION OF EXAMPLE EMBODIMENTS

Particular embodiments of a collapsible virtual reality (VR) headset are discussed in the present disclosure. Being collapsible, the VR headset can facilitate portability and storage while being robust to wear and environmental conditions. The headset includes a body structure comprising multiple reversibly collapsible layers or sections. A pair of lenses are coupled to the body structure. When a user wants to use the headset, he may simply extend the sections using hands and fit in a mobile device in an optional mounting frame of the headset to view the VR content through the lenses. The mobile device may be fitted using a variety of attachment mechanisms. When the user is done using the headset, he may collapse the body by collapsing the extended sections and when all the sections are collapsed, the headset is small enough to carry around (e.g., in a pocket). The VR headset further comprises a pair of collapsible hood elements that are coupled to the body. The hood elements may be used to block stray environmental light that often comes from the sides and interrupts with the viewing experience. Each of the hood elements may collapse independent of the body being collapsed and the hood element is collapsible into an empty space defined within the body. Therefore, when both the hood elements and body are collapsed, the entire headset is contained within one collapsed structure that is portable to carry around.

Figure 1A:
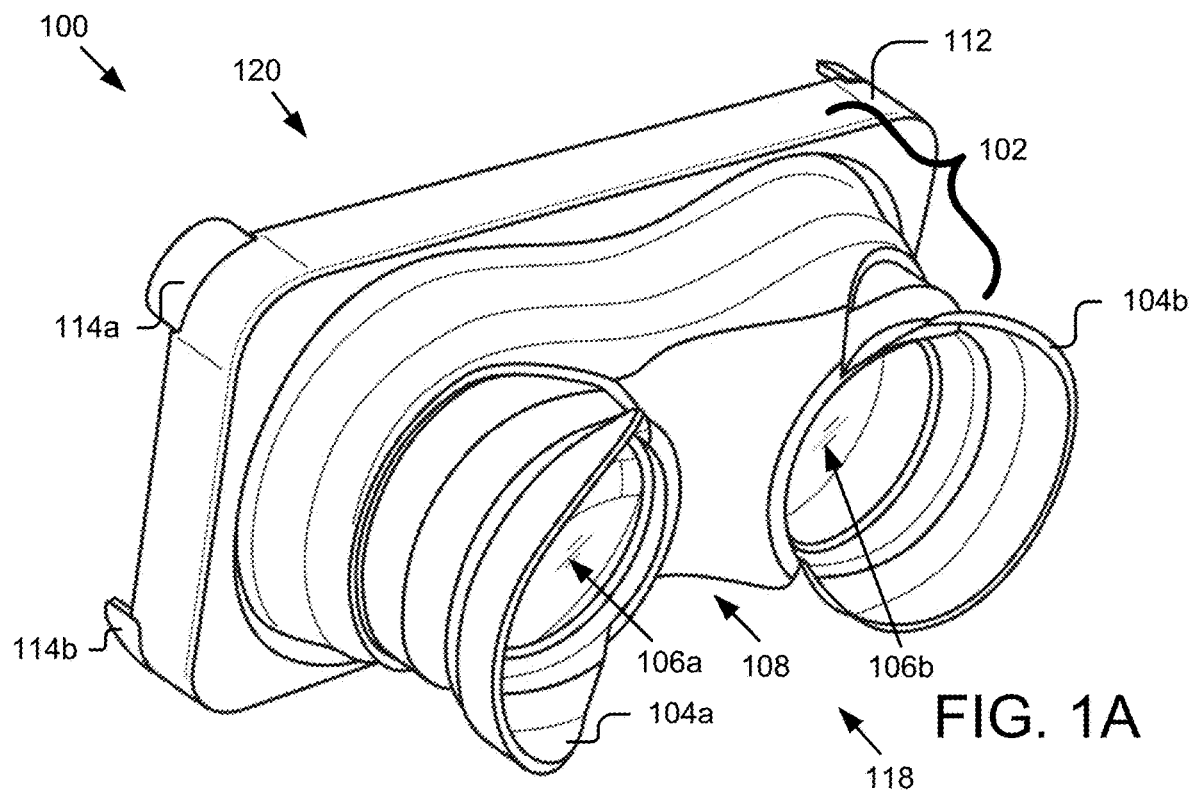
FIGS. 1A-1H illustrate different views of an example virtual reality (VR) headset when the headset is in a fully open configuration (i.e., body and hood elements of the headset are both uncollapsed).

FIG. 1A is a perspective top view of an example VR headset 100. Specifically, the figure illustrates an example embodiment of the headset 100 when the headset is in a fully opened configuration. As depicted, the headset 100 includes a collapsible body structure 102; a pair of collapsible hood elements 104a and 104b (individually and/or collectively referred to herein as 104) that are coupled to the body structure 102 (the combination of which may, in some embodiments, be referred to as a combined body structure that includes the body structure 102 and the pair of collapsible hood elements 104a and 104b); and an optional mounting frame 112. A pair of lenses 106a and 106b (individually and/or collectively referred to herein as 106) are embedded within the body structure 102. On one side of the mounting frame 112, the body structure 102 may be attached and this side may be used by a user to view VR content through the pair of lenses 106. This side is herein referred to as a user-facing side 118. On the other side of the mounting frame 112, an attachment mechanism (e.g., tabs 114a-d) may be fixed for encompassing a mobile device (discussed in further below in reference to at least FIGS. 5A-5E). This other side is herein referred to as a display side 120. In some embodiments, the attachment mechanism may be fixed directly with the body structure 102. The mobile device may be positioned such that the display of the mobile device faces the user-facing side 118 (see for example, FIG. 3). Content produced by the mobile device display can be seen through the pair of lenses 106 which gives a VR experience to the user. A groove portion 108 is provided between the pair of lenses for accommodating the user's nose when the headset is in use. When the user is viewing VR content, hood elements 104 may be used to block stray light that often comes from the sides and interrupts the viewing experience. The hood elements 104 may be used to improve the visibility of the image produced by the mobile device display and the lenses. When hood elements are not needed, the user can simply fold one or both of these elements into or onto a perimeter/circumference of the body structure 102 as shown and discussed in reference to at least FIGS. 1I-1N.

Figure 1B:
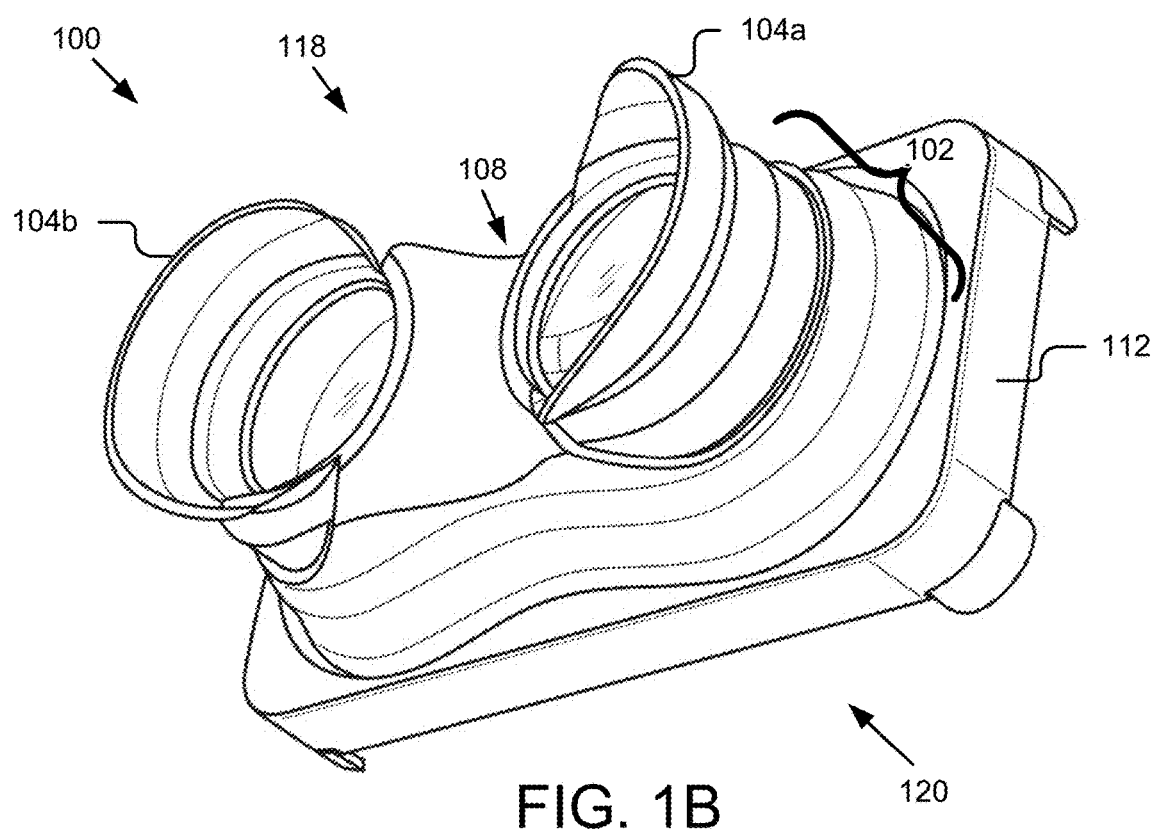
Figure 1C:
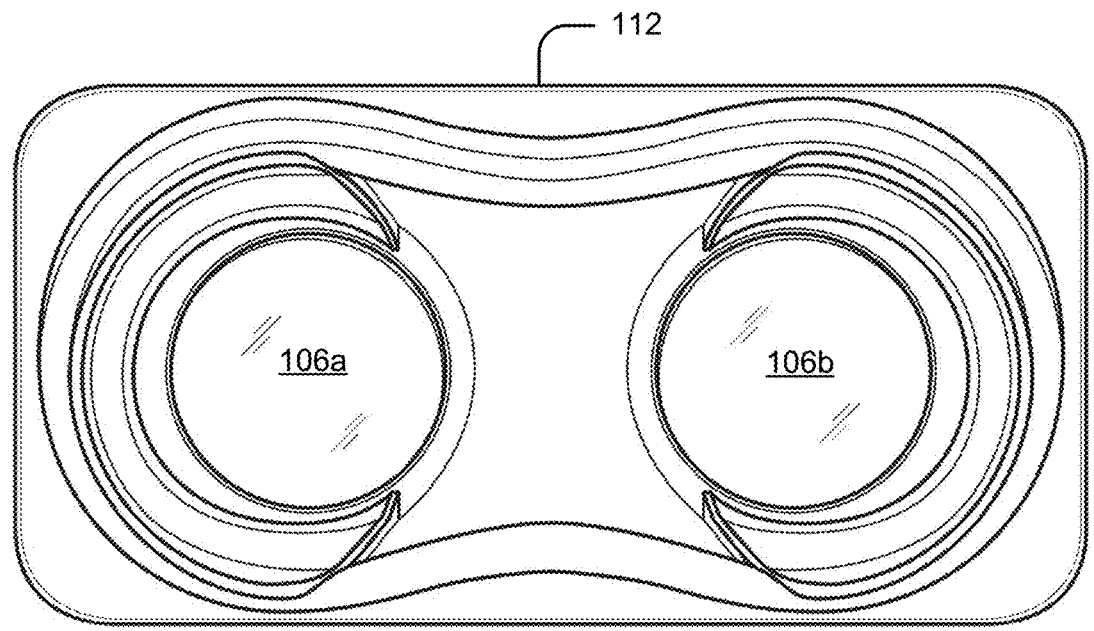
Figure 1D:
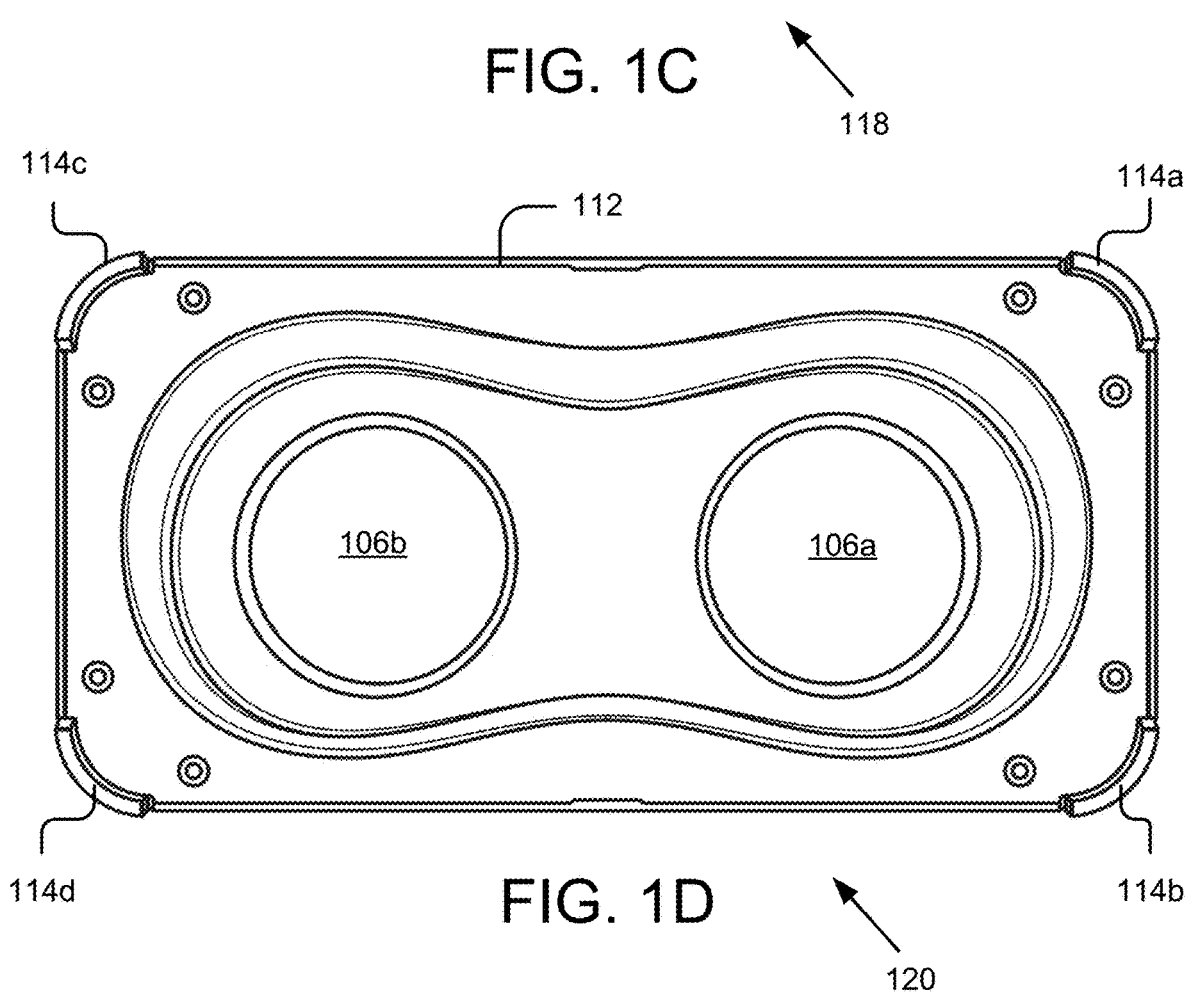
Figure 1E:
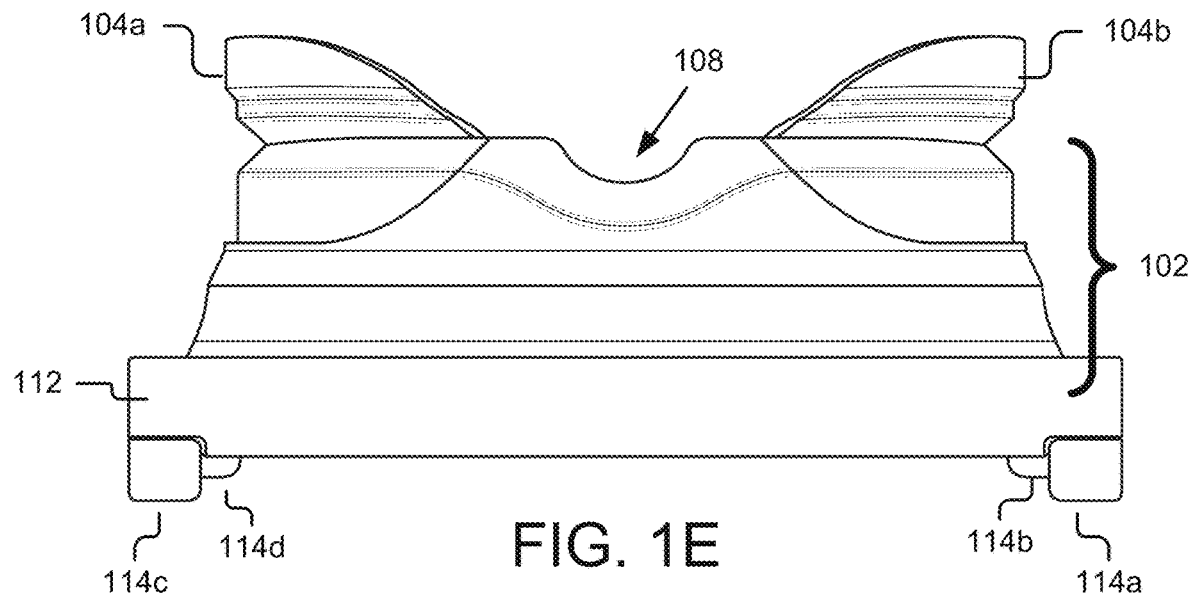
Figure 1F:
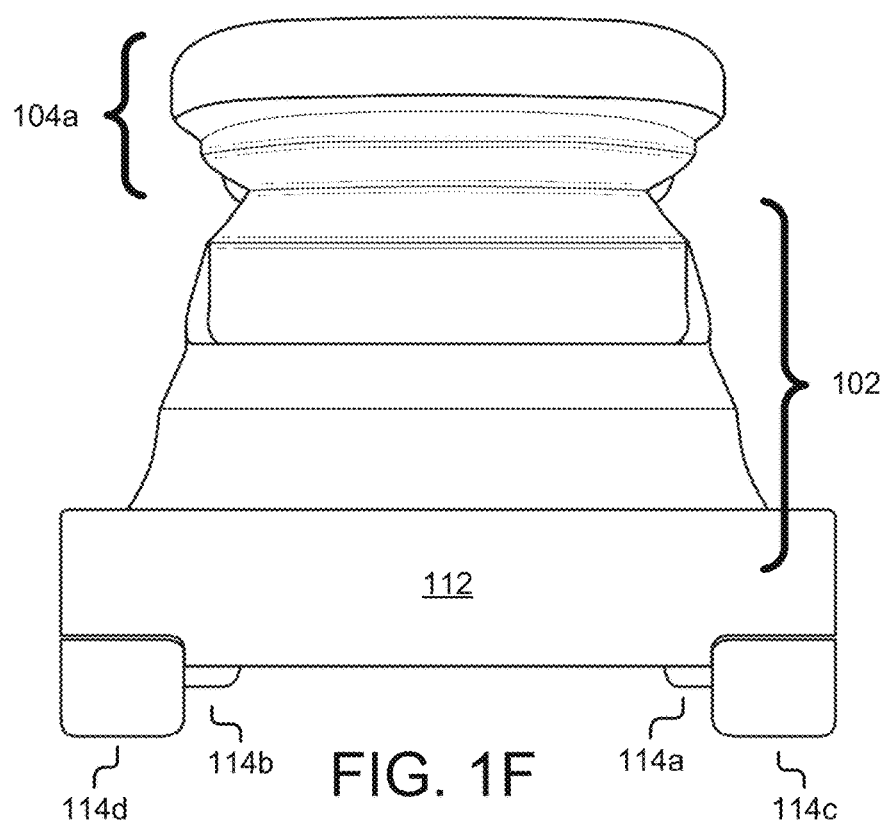
Figure 1G:
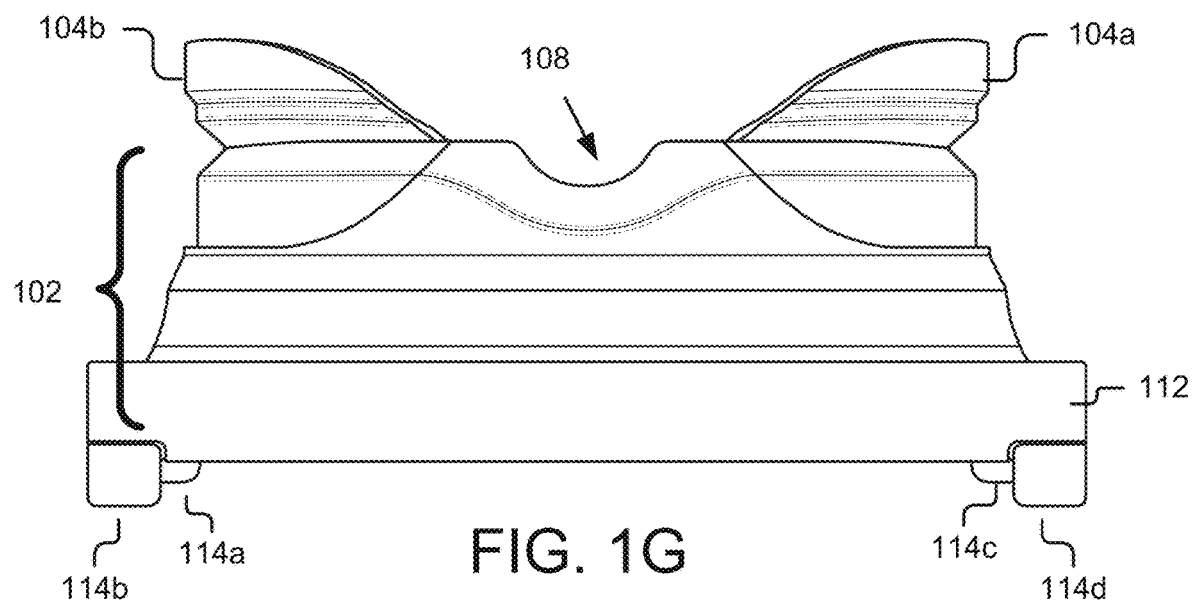
Figure 1H:
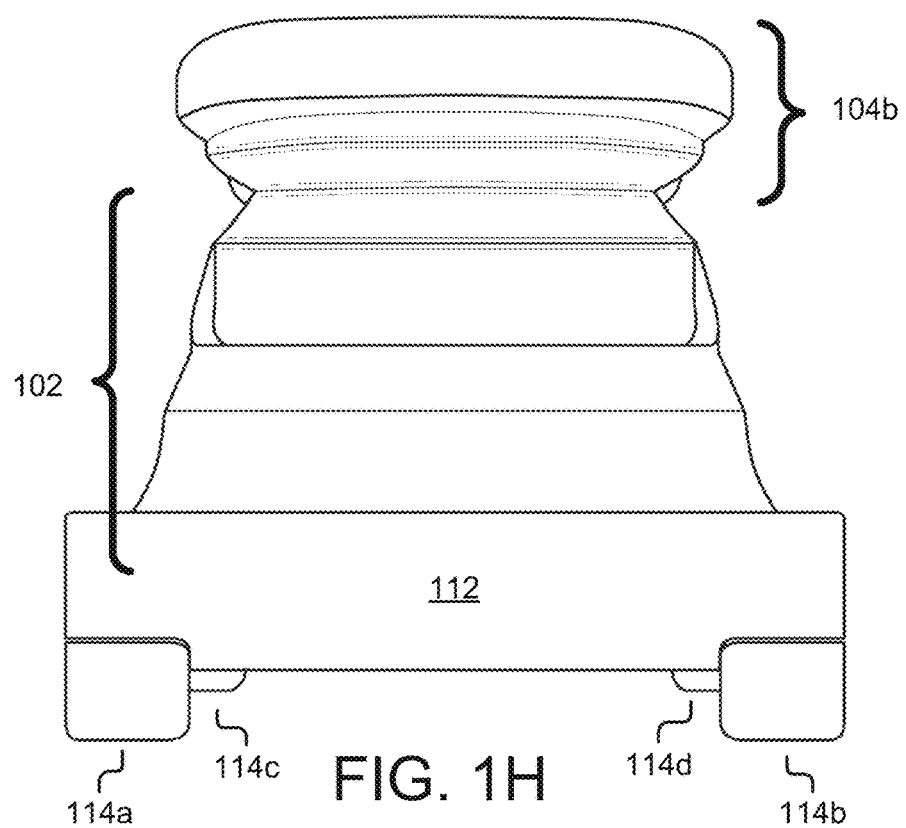

FIGS. 1B-1H show additional views of the fully extended VR headset 100. In particular, FIG. 1B is a perspective bottom view from the user-facing side 118. FIG. 1C is a straight (i.e., non-angled) view from the user-facing side 118. FIG. 1D is a straight view from front of the headset 100. FIG. 1E is a straight bottom view of the headset. FIG. 1F is a straight left side view of the headset 100. FIG. 1G is a straight top view of the headset 100. FIG. 1H is a straight right side view of the headset 100.

Figure 1I:
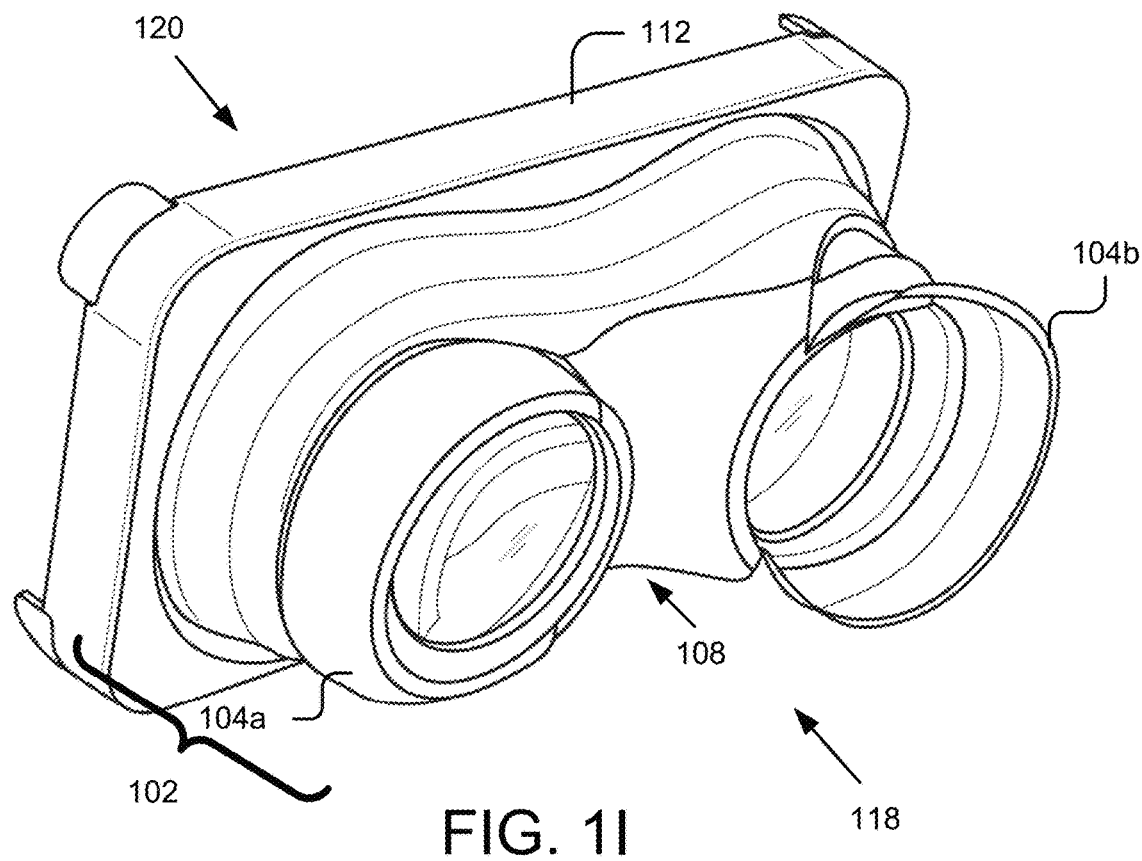
FIGS. 1I-1N illustrate different views of the VR headset when the headset is in a semi-closed configuration (i.e., body is uncollapsed and one or more of the hood elements are collapsed).
Figure 1J:
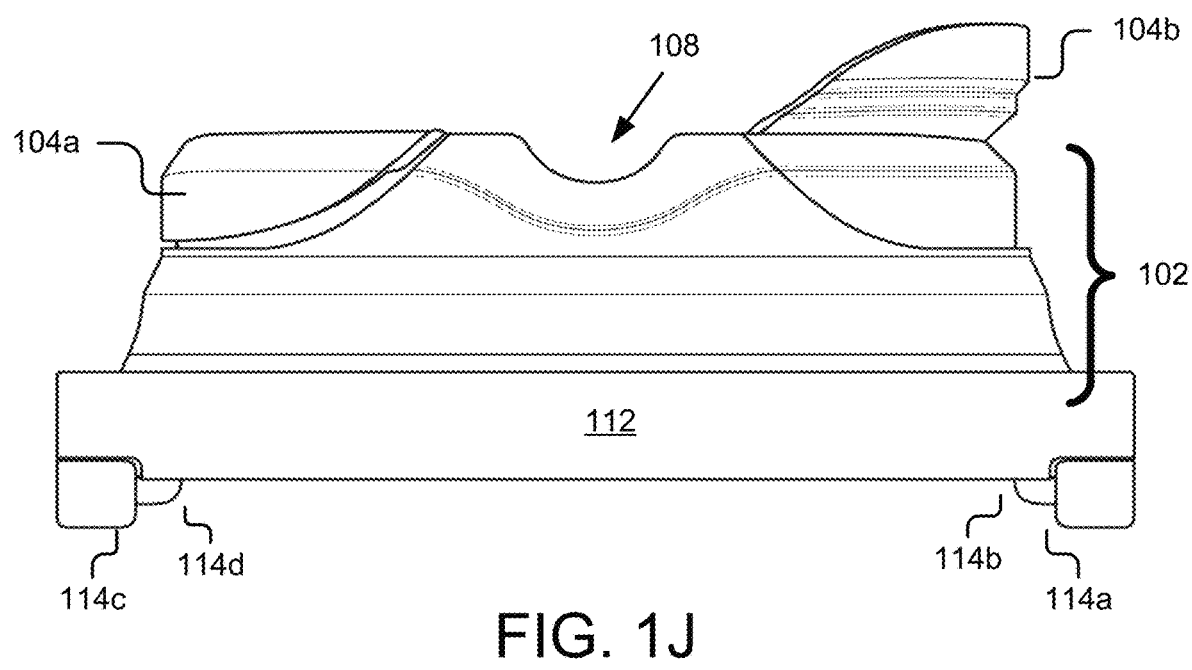
Figure 1K:
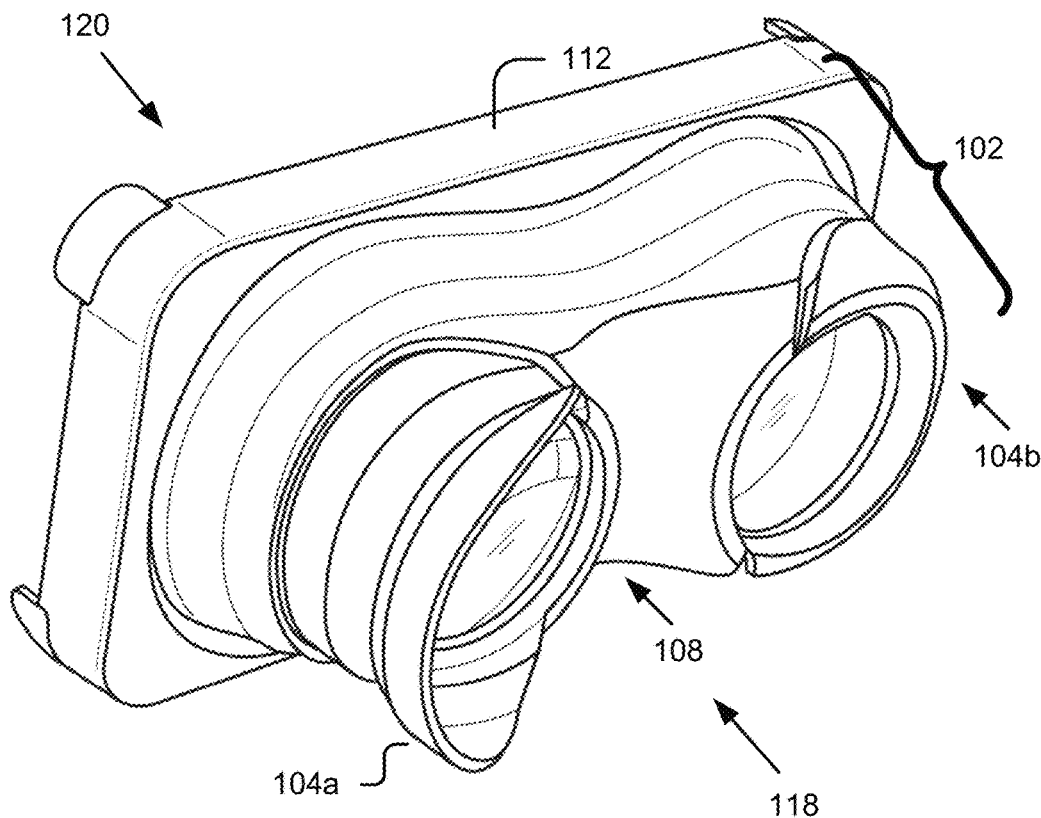
Figure 1L:
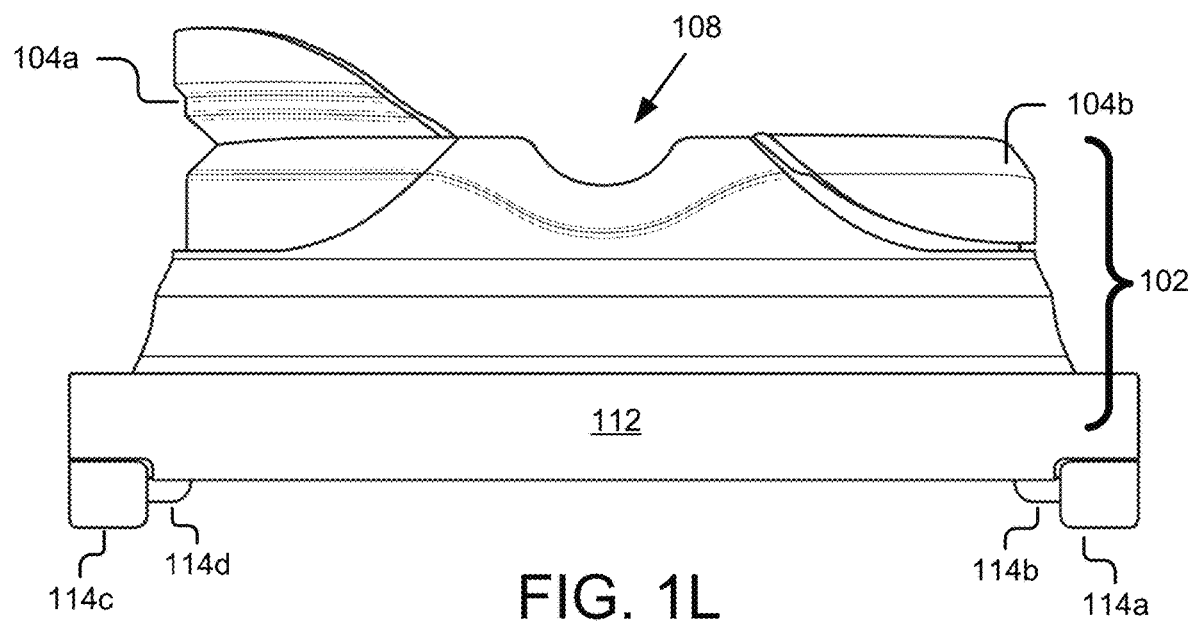
Figure 1M:
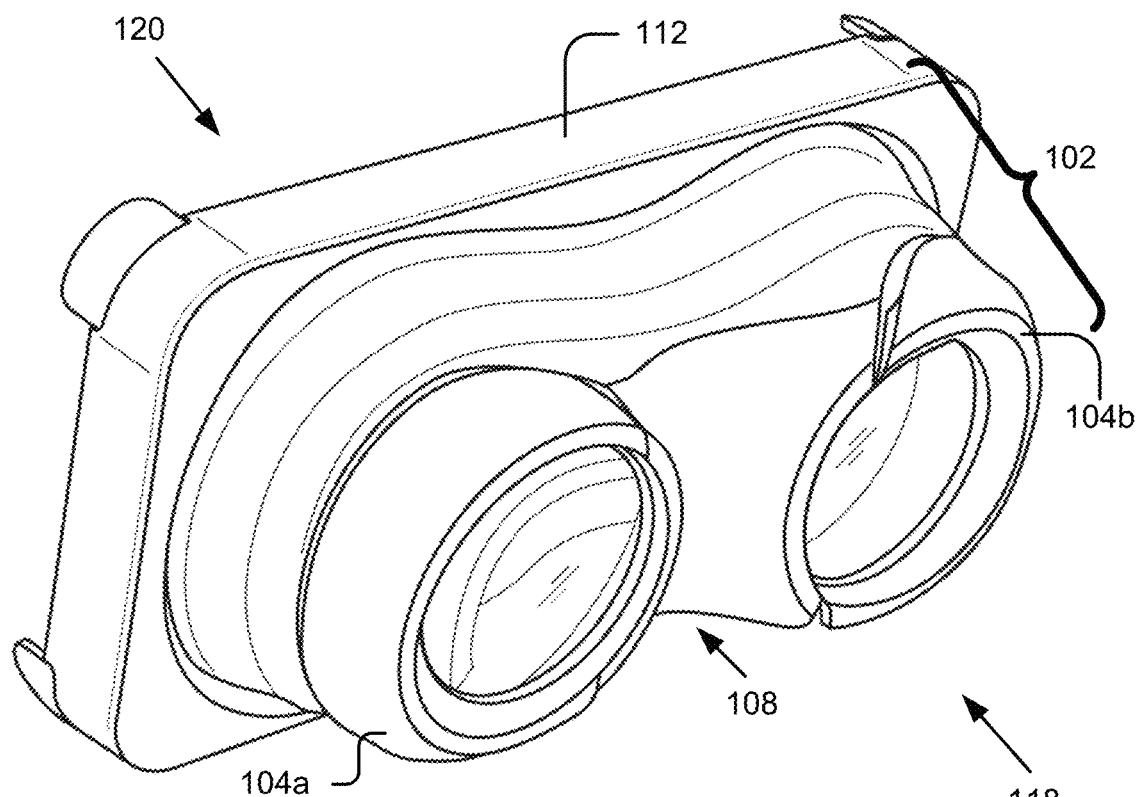
Figure 1N:
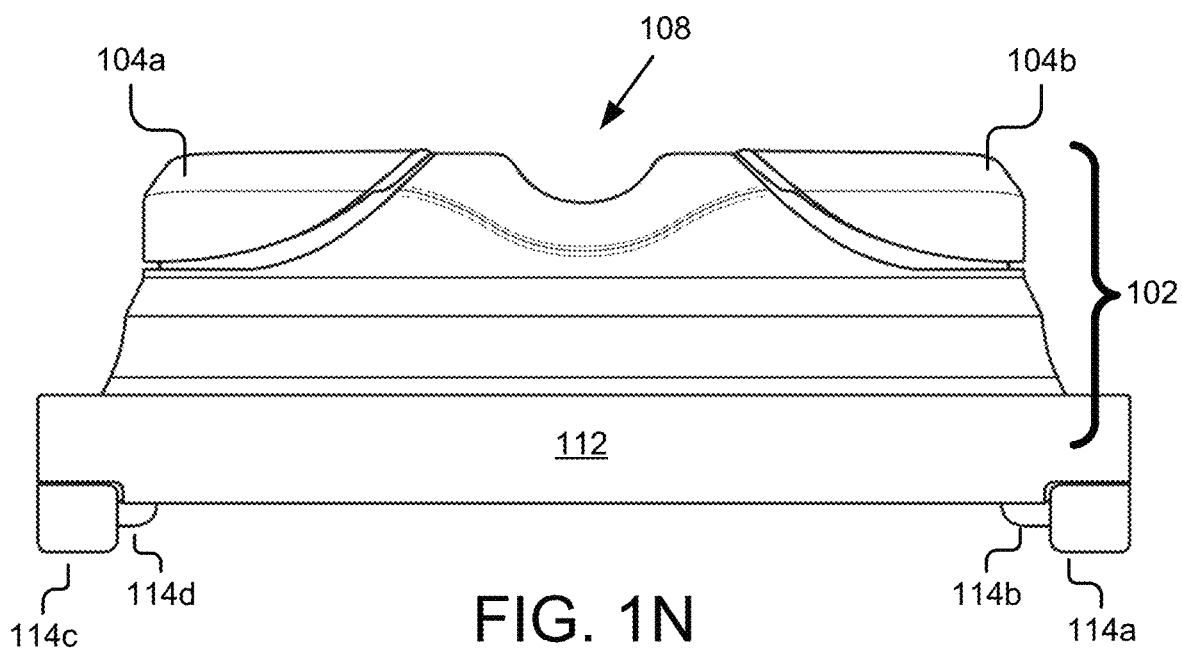
Figure 1O:
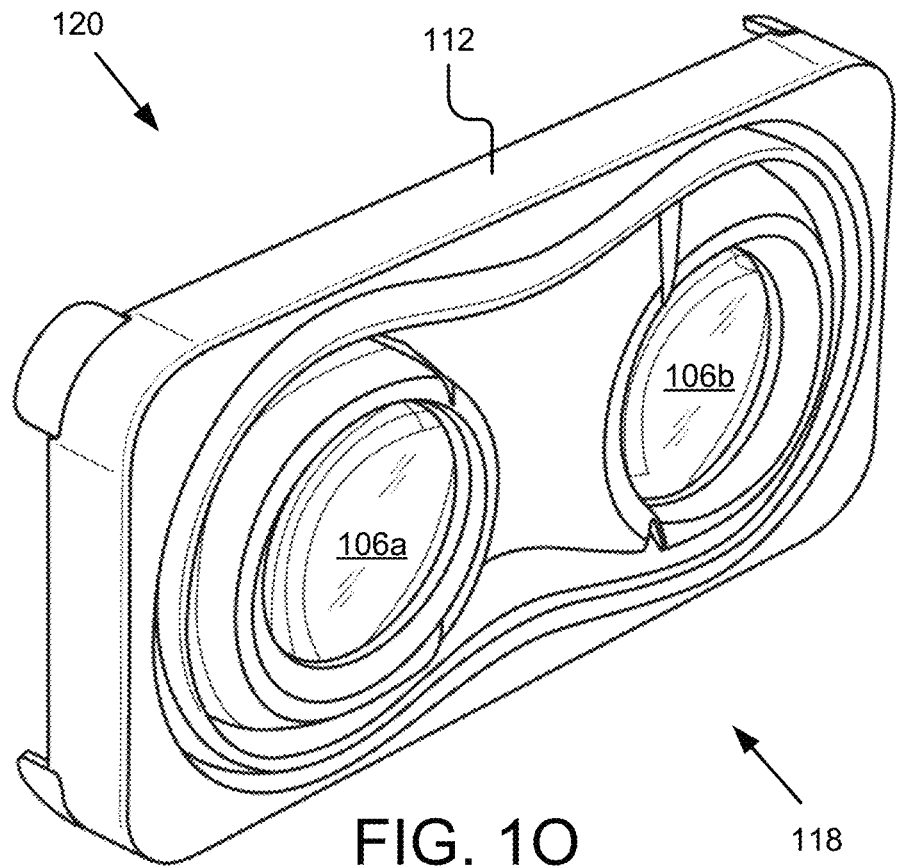
FIGS. 1O and 1P illustrate two example views of the VR headset in a fully closed configuration (i.e., body and hood elements of the headset are both uncollapsed).
Figure 1P:
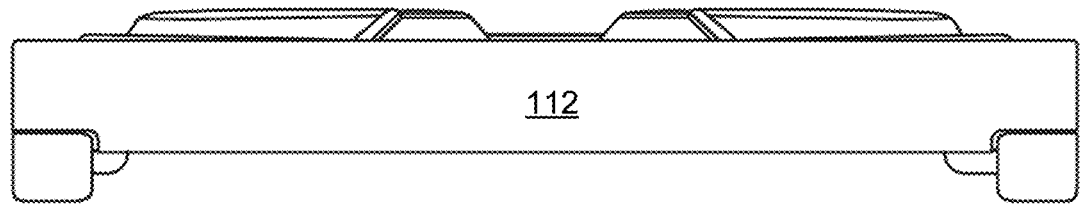
Figure 1Q:
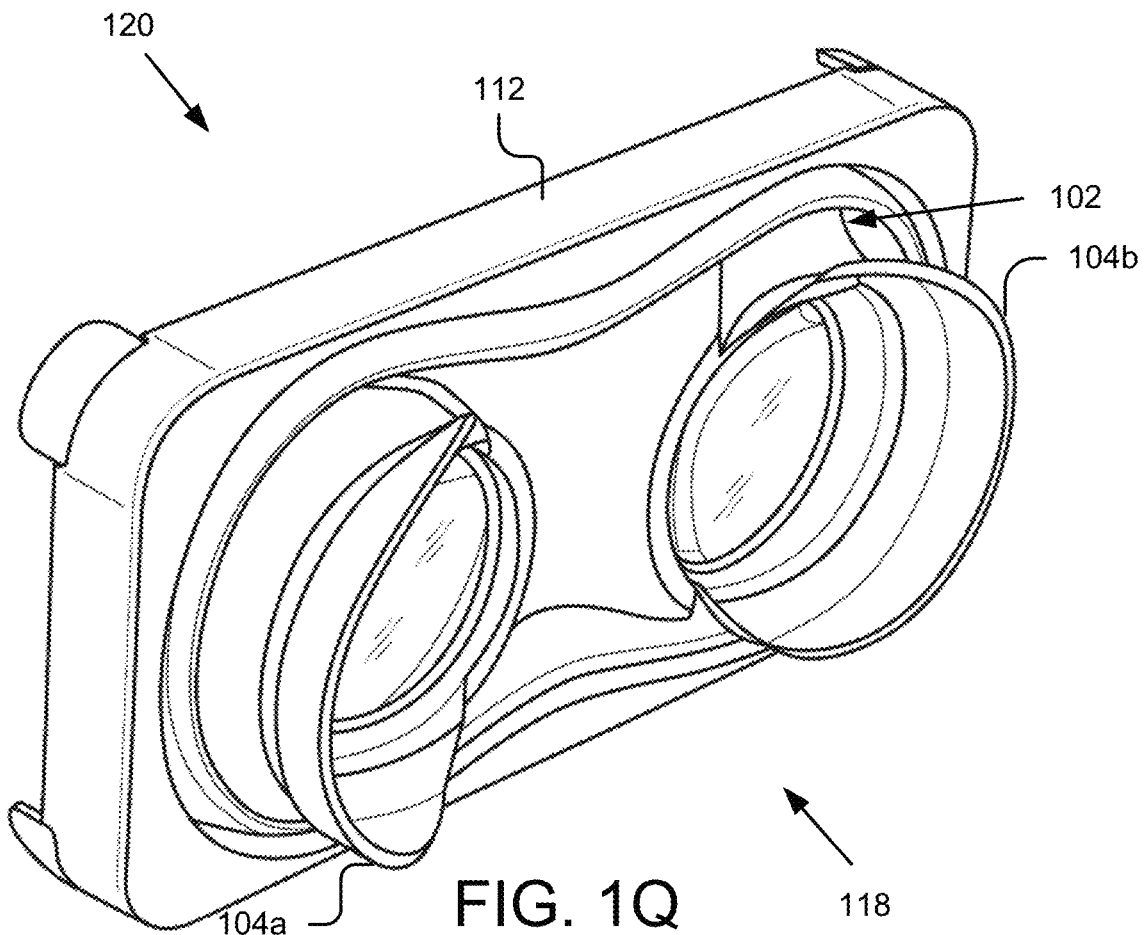
FIGS. 1Q and 1R illustrate two example views of the VR headset in another semi-closed configuration (i.e., body is collapsed and hood elements are uncollapsed).
Figure 1R:
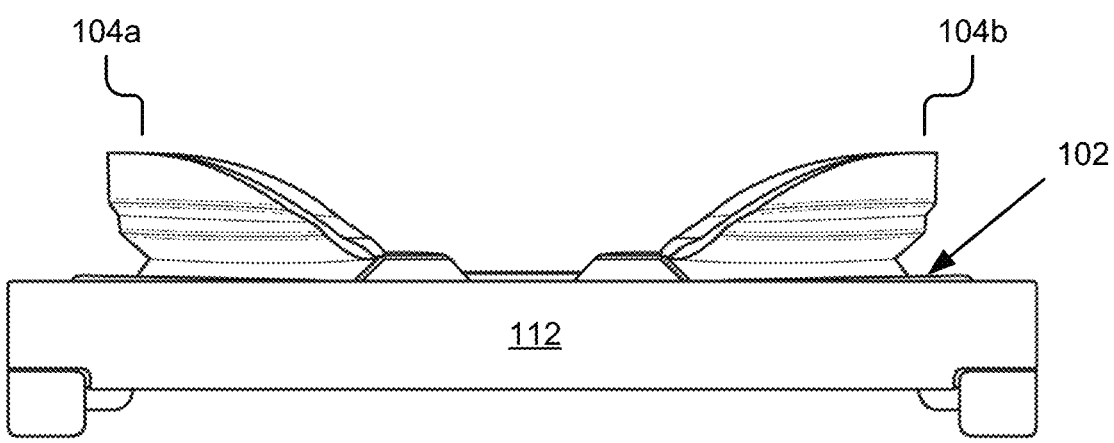
Figure 1S:
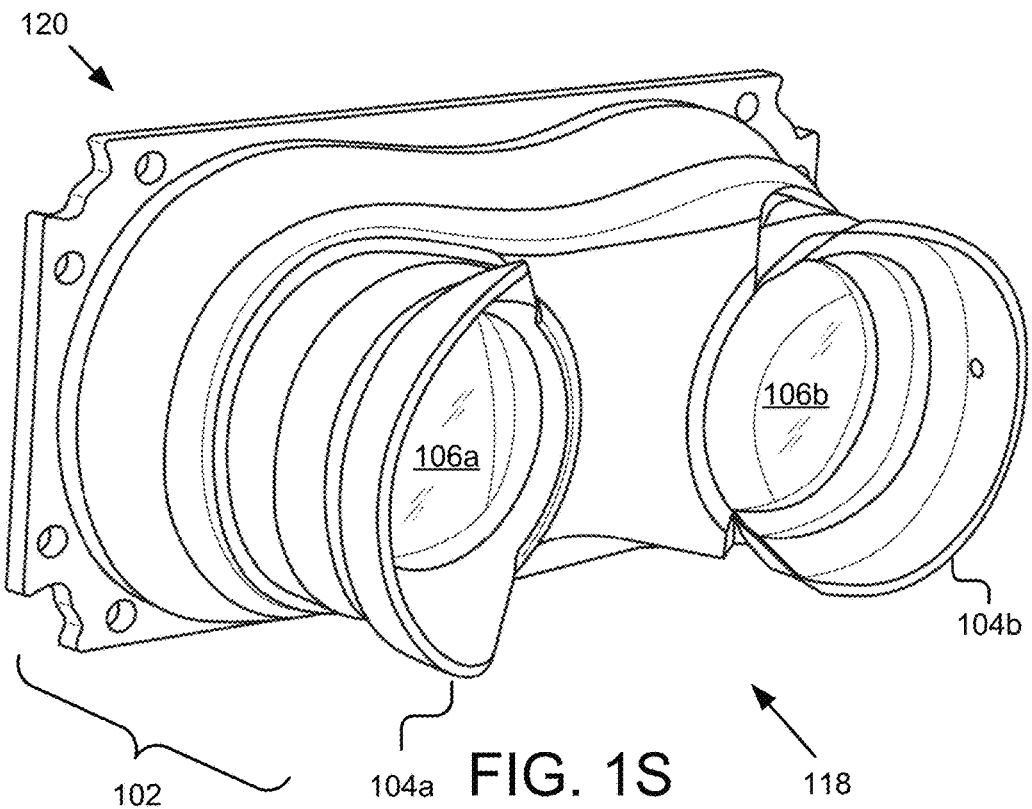
FIGS. 1S and 1T illustrate two example views of the body and hood elements of the VR headset when both of them are uncollapsed.
Figure 1T:
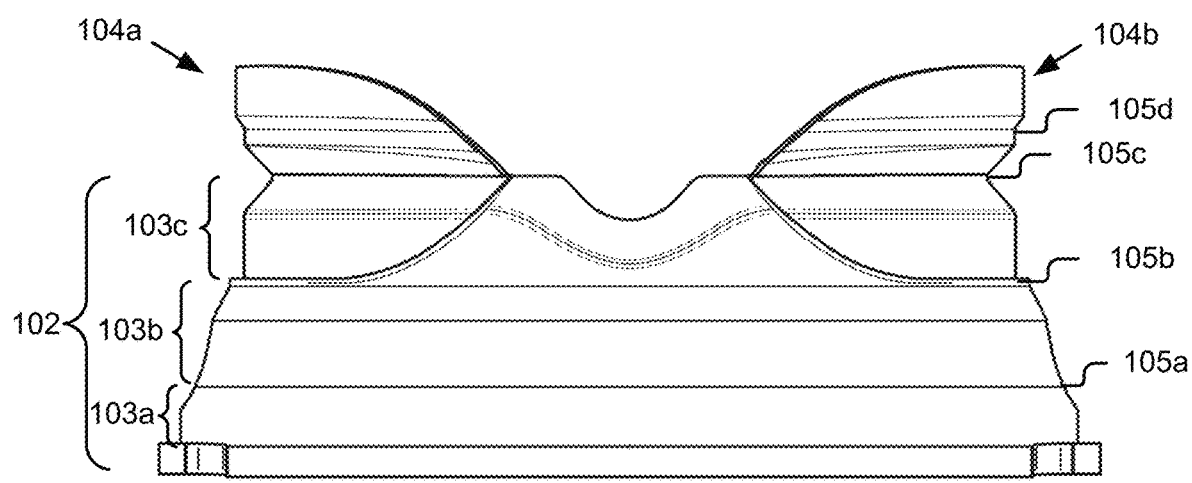

A separate and/or independent view of the body structure 102 and the hood elements 104 without the mounting frame 112 is shown in FIGS. 1S through 1V. In particular, FIG. 1S shows a perspective view (from the user-facing side 118) of the body structure 102 and the hood elements 104 without the mounting frame 112. FIG. 1T shows a straight (i.e., non-angled) bottom view of the same configuration. The body structure 102 comprises multiple sections 103a-103c that are reversibly collapsible by means of living hinges 105a and 105b located between these sections. For instance, the section 103c collapse into the section 103b by the hinge 105b and the section 103b collapse into the section 103a by the hinge 105a. In some instances, the first section 103a when collapsed is contained within the mounting frame 112. Using these multiple collapsible sections, the entire body structure 102 is collapsible. In some embodiments, when the body structure 102 is collapsed, each of the reversibly collapsible sections overlap with one another. In particular embodiments, the sections of the body structure 102 collapse in a direction perpendicular to a plane of the lenses 106. Even though the body structure 102 is shown as having three collapsible sections, particular embodiments may use any suitable number of collapsible body sections. For example, the body structure 102 may have two collapsible sections. As another example, the body structure 102 may include five or seven collapsible sections, or any other suitable odd number of collapsible sections. In particular embodiments, an odd number of collapsible sections may avoid inverting the top section (e.g., section 103c) in order to collapse the headset. Thinner lenses (e.g., Fresnel lenses) may be used to increase the number of collapsible sections, thereby reducing the overall thickness of the collapsed headset. However, it should be noted that increasing the number of sections may lower the overall structural rigidity of the body structure 102.

Similar to the body structure being collapsible, the hood elements 104 are collapsible by means of one or more living hinges. For instance, the hood elements 104a and/or 104b folds down by a first hinge 105d and then collapses onto the perimeter of the body structure 102 by a second hinge 105c. The perimeter, for example, may be a circumferential surface around the VR headset 100, such as the area between hinges 105c and 105b. In alternative embodiments, the hood elements 104a and/or 104b may fold down and collapse onto the perimeter of the body structure 102 by a single hinge (e.g., 105c). Additionally or alternatively, particular embodiments may use 3 or more hinges to increase the unfolded height of the hoods, for example to improve the seal against the head. In some embodiments, there may be a plurality of stages involved when the hood elements 104 collapse into the body. For instance, each of the hood elements 104 start from an uncollapsed stage, where the hood element extends in a direction away from outermost section of the body structure 102 (e.g., the section 103c). As the hoods are collapsed, the hoods are folded so that at least part of the hood element extends perpendicular to their initial, uncollapsed direction. Finally, the hoods are folded even further such that the hood element extends towards the outermost section, and, in particular embodiments, lie on the perimeter of the body structure 102 (e.g. against a portion of the body structure containing the lenses). In some embodiments, the hood elements 104 are collapsed into the body 102 such that they are at least partially embedded in the body structure 102. For instance, the hood elements 104 may be collapsed into an empty volume/space defined within the body structure 102.

In particular embodiments, the hood elements 104 may be collapsible independent of the body structure 102 being collapsed, and also independently of each other. In some embodiments, only one hood element may be collapsed. By way of an example, FIGS. 1I and 1J show a perspective top view (from the user-facing side 118) and a straight non-angled bottom view of the VR headset 100 with the left hood 104a collapsed, respectively. As another example, FIGS. 1K and 1L show a perspective top view (from the user-facing side 118) and a straight non-angled bottom view of the VR headset 100 with the right hood 104b collapsed, respectively. In particular, embodiments, one advantage of having hood elements foldable/collapsible independent of each other is that the user can expand one of the hood elements for one of the lenses and view the VR content through that single lens while using the other eye to view what is being recorded by a 360° camera which may be connected to the phone attached with the VR headset.

In some embodiments, both the hood elements 104a and 104b can be collapsed. By way of an example, FIGS. 1M and 1N show a perspective top view (from the user-facing side 118) and a straight non-angled bottom view of the VR headset 100 with both the hood elements 104a and 104b collapsed, respectively. Furthermore, FIGS. 1Q and 1R also shows that the body structure 102 may be collapsed independently from the hood elements 104 being collapsed.

The semi-opened/semi-collapsed configurations as depicted in at least FIGS. 1I-1N may be advantageous for a variety of reasons. For example, in a semi-opened configuration such as one depicted in FIGS. 1M and 1N (with hood elements 104 collapsed), the VR headset is usable since the body structure 102 is uncollapsed and this configuration can be ideal for a user wearing prescription glasses. This configuration can also or in the alternative be used in a dark environment where hood elements are not needed to block stray light.

In particular embodiments, the body structure 102 is flexible as it is capable of being extended or collapsed as discussed elsewhere herein. The body structure 102 can be made of rubber and may have enough rigidity and/or can be shaped such that the body structure is stable in either the extended or collapsed configurations—e.g., the body structure can be bi-stable. In particular embodiments, the body structure 102 may be made of silicone material. A hard silicone material may be used in certain portions of the body structure 102 and soft silicone may be used in the remaining portions. For example, a hard silicone may be used in areas around the lenses 106 and the base of the body structure 102 for overall stability.

In some embodiments, the hood elements may be made of a material distinct from the material of the body. In some embodiments, the hood elements may also be made of silicone material but may have a degree of rigidity different from the degree of rigidity in the body. For example, the hood elements may be made of silicone material having a degree of rigidity higher than the one in the body. The vice-versa of this may also be possible and is within the scope of the present disclosure.

FIGS. 1O and 1P illustrate a perspective top view (from the user-facing side 118) and a straight (non-angled) bottom view of the VR headset 100 when both the hood elements 104 and the body structure 102 collapse with respect to the mounting frame 112, respectively. As discussed elsewhere herein, the hood elements 104 are collapsed into or onto (e.g., the perimeter of) the body structure 102 and then the body structure is collapsed onto itself (i.e., the sections of the body collapse into one another). In some embodiments, when each of the sections of the body and the hood elements are collapsed, the first section of the body structure 102 (e.g., section 103a) is contained within the mounting frame, the hood elements are located between the first section and a portion of the lenses 106; and the lenses 106 are contained within the first section. In some embodiments, when each of the sections of the body structure 102 and the hood elements 104 are collapsed, the hood elements 104 may overlap with the reversibly collapsible sections of the body. FIG. 4C provides an additional view supporting the aforementioned description.

In particular embodiments, when the hood elements 104 and the body 102 are collapsed, the user-facing side components of the VR headset 100 are contained within the mounting frame 112. For instance, the mounting frame defines a volume within which the hood elements 104, the pair of lenses 106, and the body 102 may be contained when both the body 102 and the hood elements 104 are collapsed. In some embodiments, when the hood elements 104 and the body 102 are collapsed, a total thickness of the VR headset 100 (excluding the attachment mechanism) is equal to a thickness of the mounting frame 112. By way of an example, the total thickness of the VR headset, when both the hood elements 104 and the body 102 are collapsed, may be approximately 15 mm. In some embodiments, when the body 102 and the hood elements 104 are collapsed, the largest width of the VR headset 100 is equal to the width of the mounting frame.

FIGS. 1Q and 1R illustrate a perspective top view (from the user-facing side 118) and a straight (non-angled) bottom view of the VR headset 100 when the body structure 102 is collapsed but the hood elements 104 are not collapsed with respect to the mounting frame 112. In this scenario, a thickness of the VR headset 100 may be equal to the thickness of the mounting frame 112 plus a thickness of the extended hood elements 104.

Figure 1U:
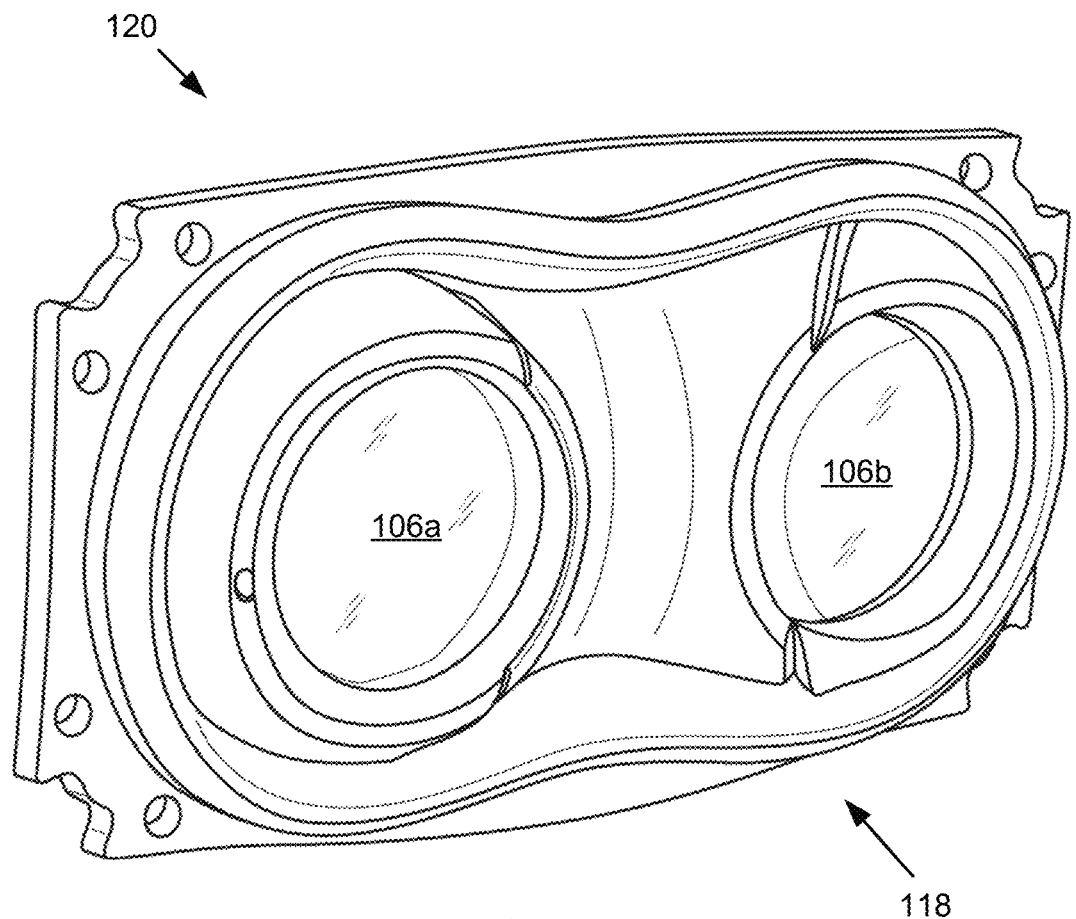
FIGS. 1U and 1V illustrate two example views of the body and hood elements of the VR headset when both of them are collapsed.
Figure 1V:
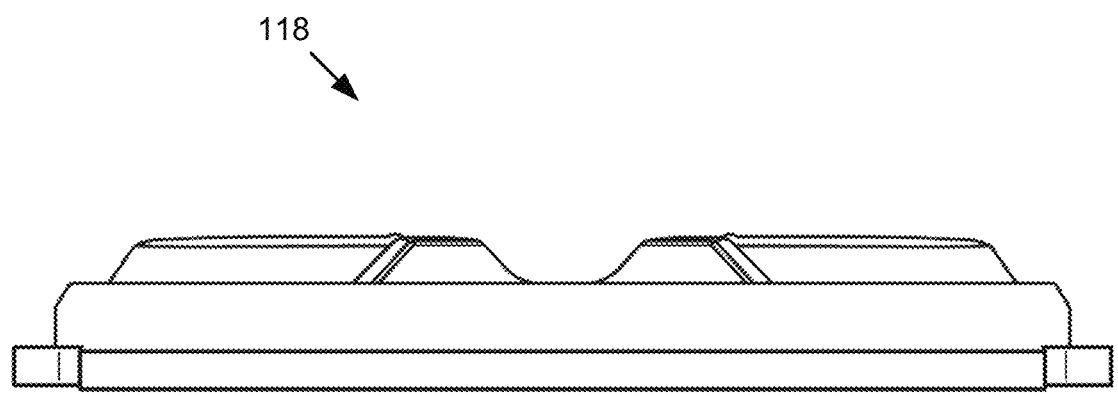

FIGS. 1U and 1V illustrate a perspective top view (from the user-facing side 118) and a straight (non-angled) bottom view of the collapsed body structure 102 and the collapsed hood elements 104 without the mounting frame 112, respectively. In some embodiments, a thickness of the combined body structure with the collapsed hood elements is equal to a thickness of the body structure. In some embodiments, the thickness of the body structure may be equal to one of the reversibly collapsible sections of the body structure. For example, the thickness of the collapsed body structure may be equal to the thickness of the section 103a of the body structure.

In some embodiments, the lenses 106 may define a total thickness of a body structure 102. For instance, the absolute thickness of the body structure 102 during use may be determined by the focal length of the lenses 106. The minimum thickness of the collapsed headset (excluding any attachment mechanism) may be either the thickness of the lens or roughly a millimeter or so greater than one third of the focal length, whichever is greater.

Below is an example parameterization of the approximate thickness in the three functional device states in terms of focal length:

Collapsed: $(focal\ length + A)/X$

Partially collapsed or semi-closed: $focal\ length + A$

Extended/fully opened: $(focal\ length + A) * Y/X$,

Where A is nearly 1 mm-3 mm, which may depend on some lens optical characteristics, X is the number of collapsible sections in the body structure, Y is number of sections/layers associated with hood elements+X.

Based on the above equations, it may be realized that higher the number of collapsible sections (X) in the body, the smaller may be the total thickness. However, it should be noted that increasing the number of body sections may lower the overall structural rigidity of the structure. In some embodiments, the number of body sections may be increased using substantially thinner lenses, such as for example Fresnel lenses.

Figure 2:
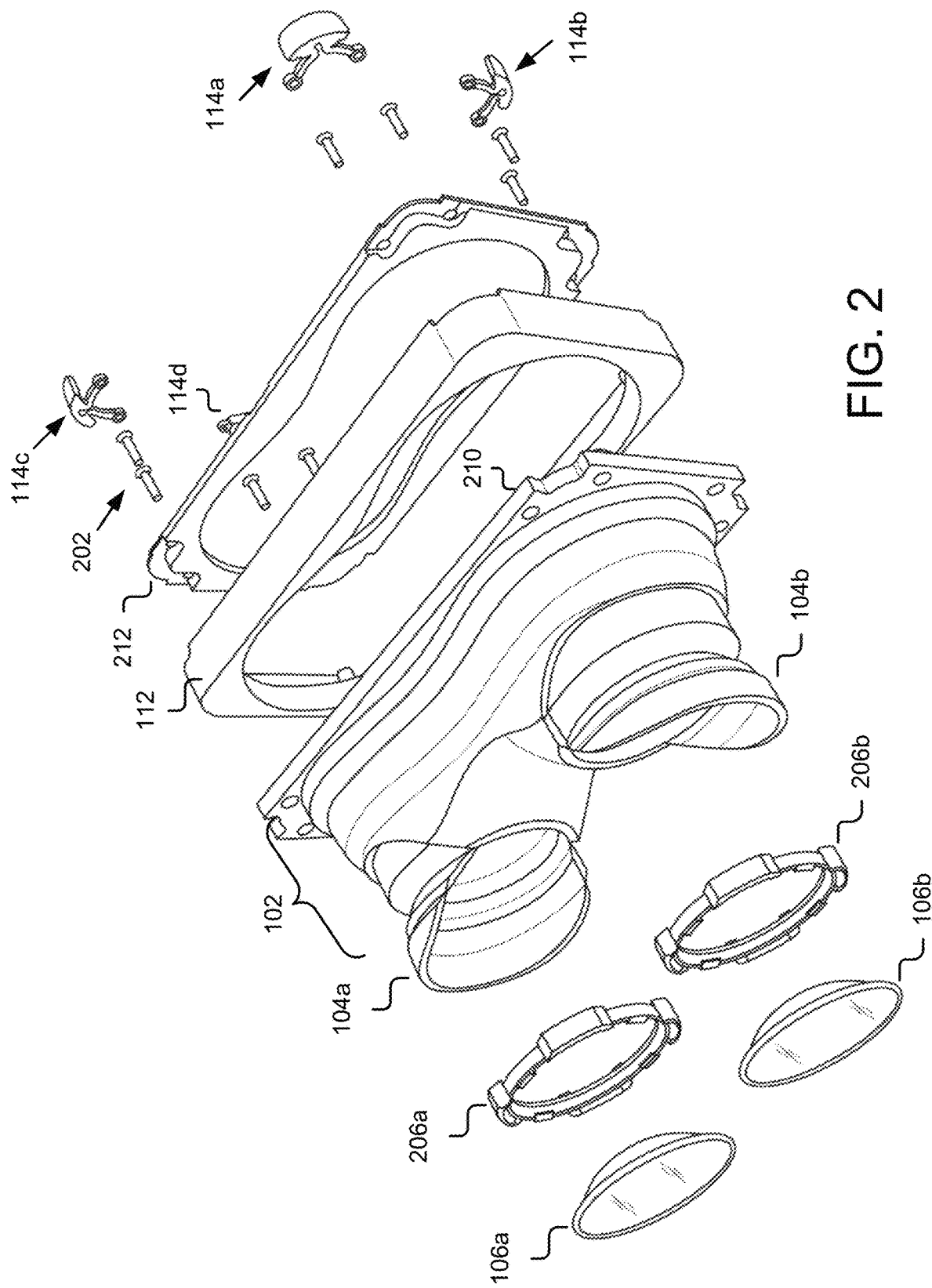
FIG. 2 is an exploded view showing different elements of the VR headset.

FIG. 2 is an exploded view of the VR headset 100 that separately shows the different components/elements of the headset. Note that the description of some of the elements of the headset are already discussed above in reference to FIGS. 1A-V and therefore the description of these elements will not be repeated here. In one embodiment, the headset 100 includes the body 102; the hood elements 104a and 104b that are coupled to the body 102; and lenses 106a and 106b, which are supported by lens holders 206a and 206b, respectively (individually and/or collectively referred to herein as 206); and the mounting frame 112 (optional). Each of the lenses 106 fits into its respective lens holder 206, which is embedded within the body structure 102 as shown in at least FIGS. 1A-1D, 1M, 1O, 1Q, 1S, and 1U. In some embodiments, instead of separate lens holders for each lens, a single lens frame may be used for supporting the two lenses 106. This may be advantageous for increasing the overall stiffness of area around the lenses and/or for reducing the parts count in the headset. The lens holders 206a and 206b or the lens frame may be made of a rigid plastic material that is molded into the silicone material of the body structure 102. The mounting frame 112 comprises a mounting cover 212 that has sufficient spacings for incorporating an optional attachment mechanism. The attachment mechanism shown here includes tabs 114a-114d that attach to the four corners of the mounting cover 212 via screws 202 to secure a mobile device. The mobile device may be placed within these tabs such that the display of the mobile device faces the back side 210 of the body. In some embodiments, the tabs may be fixed tabs that encompass device of only certain dimensions (discussed in further detail below in reference to FIG. 5A). In some embodiments, the tabs may be self-centering tabs that are auto-adjustable to encompass devices of varying dimensions (discussed in further detail below in reference to FIG. 5C). It should be noted that the headset is not limited to device attachment using tabs and other ways of attaching the device with the headset are also possible and are within the scope of the present disclosure. For example, the device may be attached using a clip as discussed in reference to FIGS. 5D and 5E below.

Figure 3:
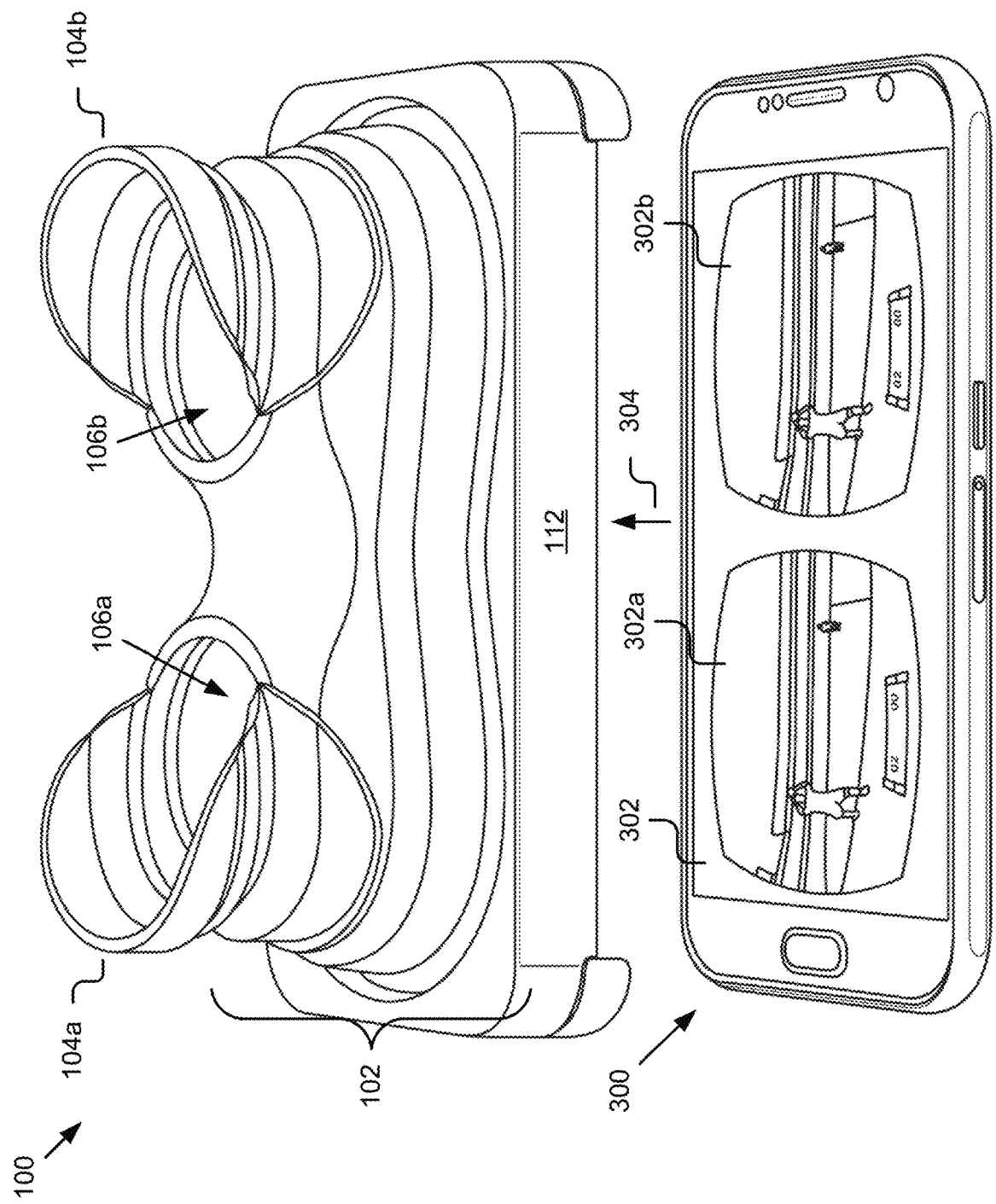
FIG. 3 shows an example mobile device that may be used with the VR headset for providing digital content to a user.

FIG. 3 shows an example mobile device 300 that may be used with the VR headset 100 for providing digital content. The mobile device may be any media device that is capable of displaying digital content (e.g., images, videos, short clips, etc.) and attachable with the mounting frame of the VR headset. For example, the mobile device may be a smartphone, a tablet computing device, or the like. In some embodiments, the mobile device may include one or more components of the computer system 800 illustrated in FIG. 8. For instance, the mobile device may include a processor for processing digital content, a memory for storing the digital content, and a display for displaying the digital content. In some embodiments, the display provides the content in two separate display portions where each display portion is configured to display content specific to each eye of a user. For example, as shown in the display 302, a left display portion 302a includes content for the left eye and a right display portion includes content for the right eye of the user. When the user views the content in these two display portions through the pair of lenses 106a and 106b, the user gets immersed into a VR environment.

The mobile device 300 may be attached with the mounting frame 112 via corner tabs 114a-d (see FIG. 5A) although other attachment mechanisms are also possible and are within the scope of the present disclosure as discussed elsewhere herein. The tabs 114a-d may serve as clasps to secure the mobile device 300 to the headset 100. The device 300 may be placed or secured such that the display 302 of the device faces the user eyes (as indicated by reference numeral 304).

Figure 4A:
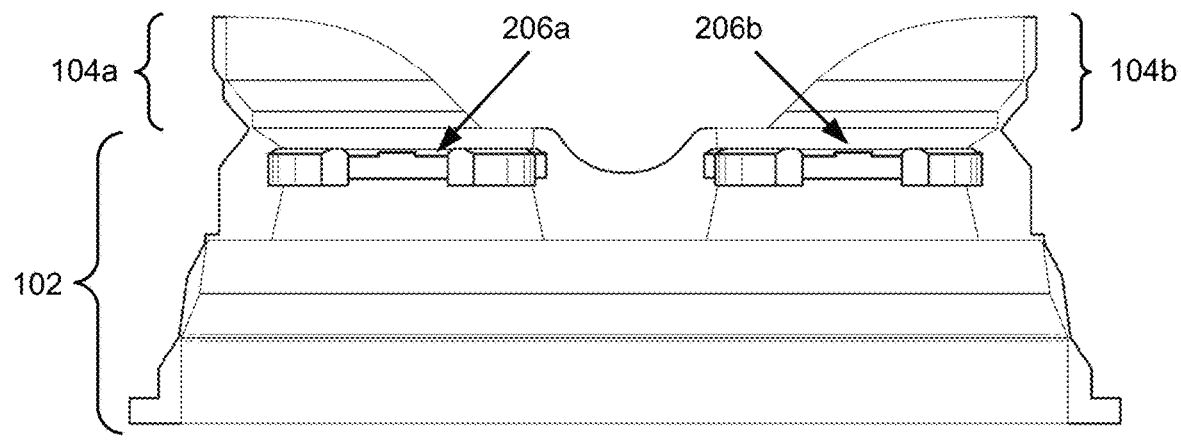
FIGS. 4A-4C are cutaway views of the VR headset in fully opened, semi-closed, and closed configurations.
Figure 4B:
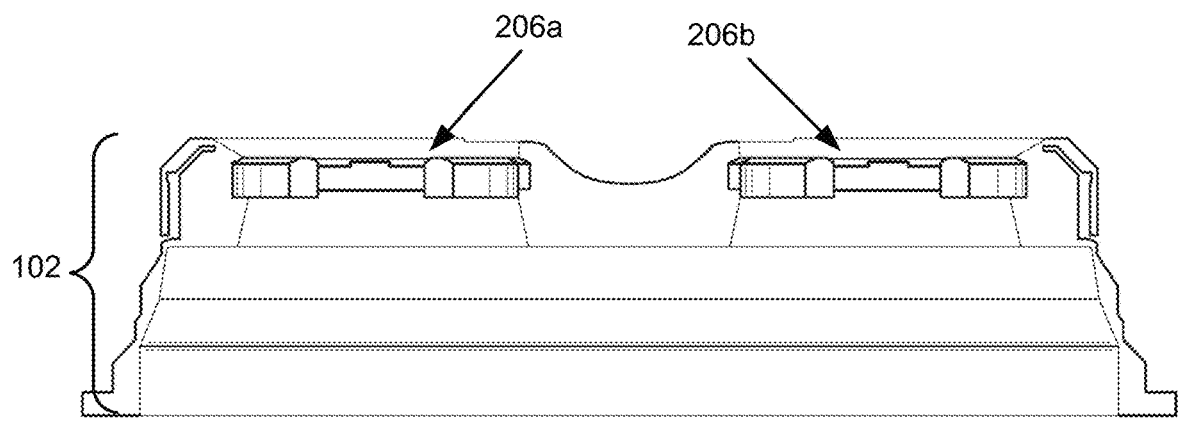
Figure 4C:
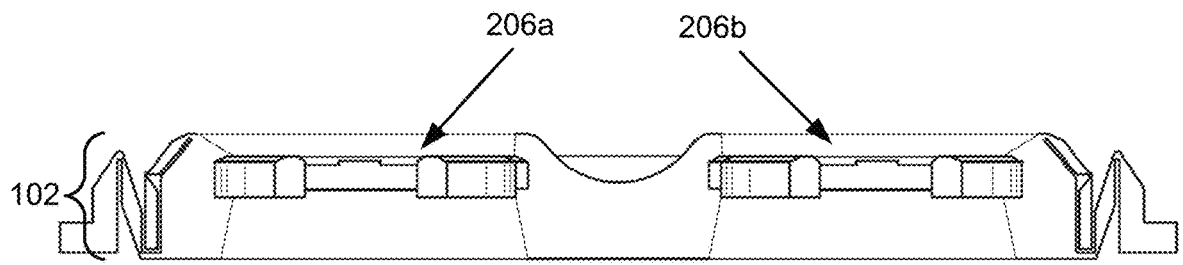

FIGS. 4A-4C are cutaway views of the VR headset in three different configurations. Relatively thicker lines in FIGS. 4A-C illustrate features that are relatively closer to the viewer, while relatively thinner lines illustrate features that are relatively farther from the viewer. FIG. 4A shows a cutaway view of the headset in a fully extended or opened configuration i.e., body 102 uncollapsed and hood elements 104 uncollapsed. FIG. 4B shows a cutaway view of the headset in a semi-closed configuration i.e., body 102 uncollapsed and hood elements 104 collapsed. FIG. 4C shows a cutaway view of the headset in a fully closed configuration i.e., body 102 collapsed and hood elements 104 collapsed.

Figure 5A:
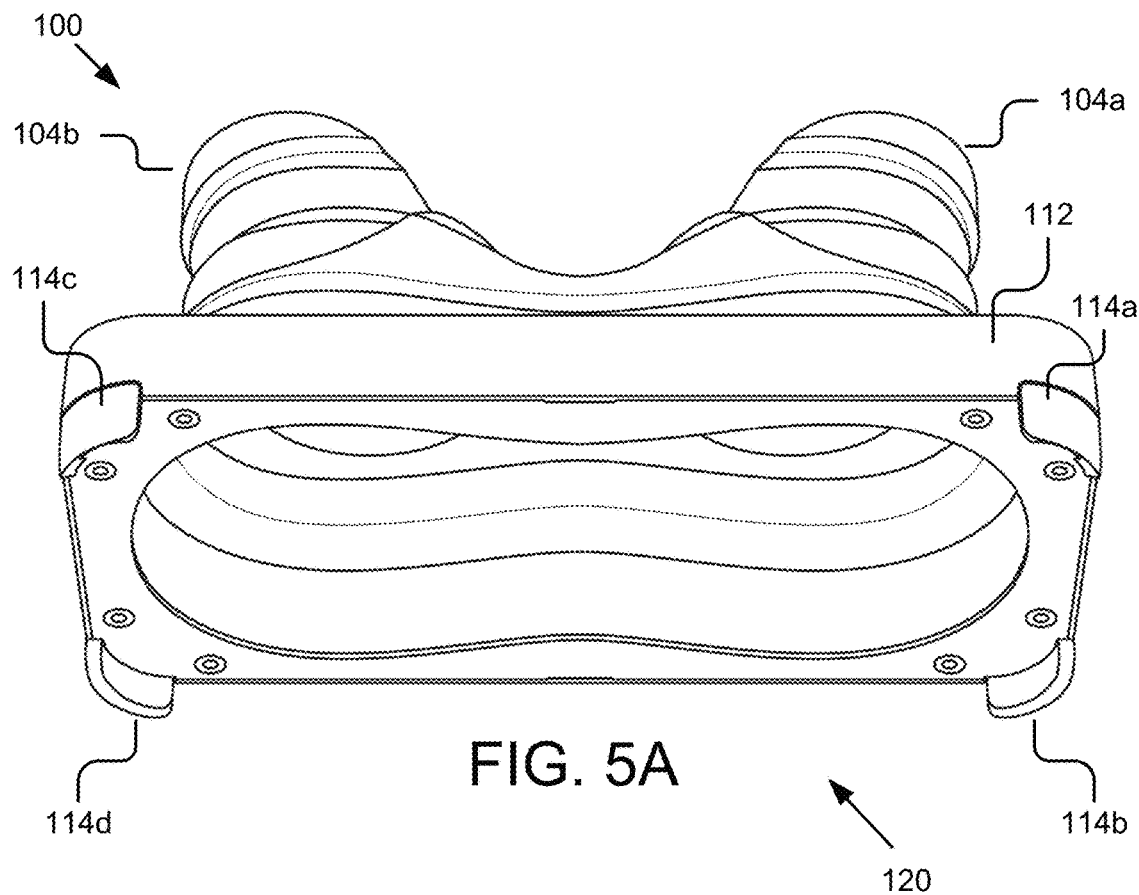
FIGS. 5A-5E illustrate example attachment mechanisms that can be used with the VR headset. In particular.

FIG. 5A shows an example attachment assembly by which a device can be attached with the headset. The attachment assembly may include tabs 114a-d that may be located on the four corners of the mounting frame 112. The tabs 114a-d may be installed into the mounting frame 112 with the help of screws, as shown for example in FIG. 2. The tabs 114a-d can be substantially rigid but with enough flexibility to "snap on" the device, such as the mobile device 300. For the "snap on" embodiment, the tabs can be replaceable such that different sets of tabs could be installed by the user to accommodate different sizes of phones.

Figure 5B:
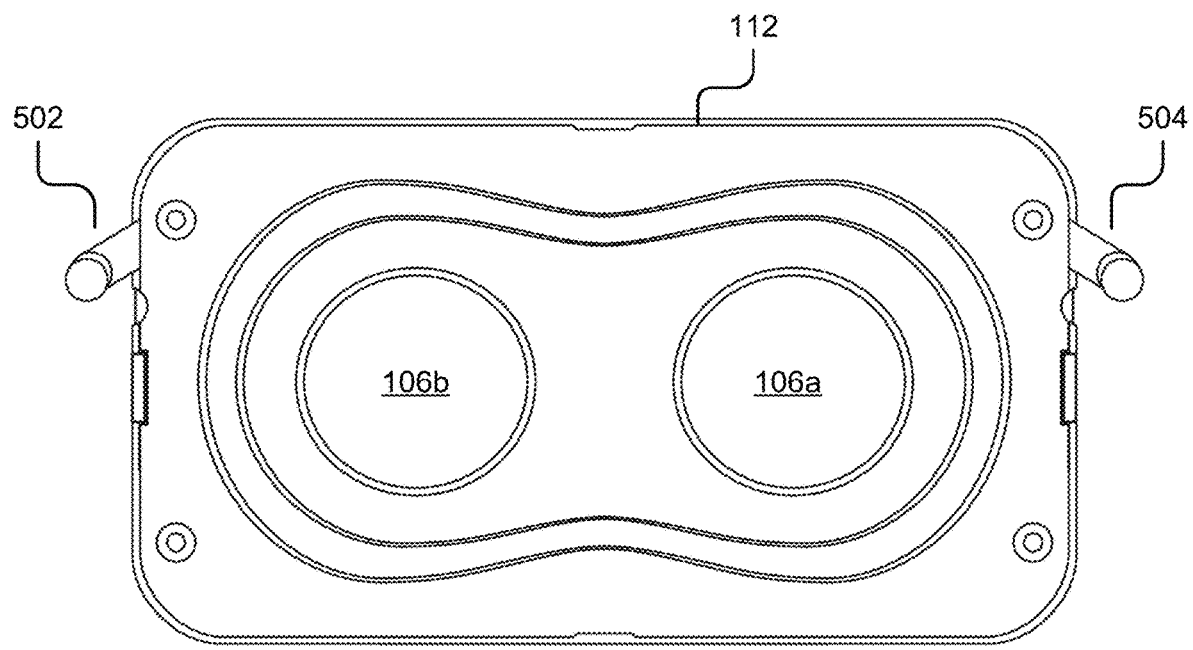

FIG. 5B shows another example attachment assembly by which a device can be attached with the headset. As depicted, the attachment assembly includes side tabs/slots 502 and 504 that may be connected to the display side of the mounting frame 112. The slots 502 and 504 may be adjustable to accommodate devices of varying widths. For instance, each of the slots may adjust (e.g., extend outwards, rotate, etc.) in two or three positions to accommodate different device widths. The device may be secured using these side tabs such that the device is centered laterally with respect to the headset.

Although not shown, a head strap may be attached with the headset for hands-free operation. For example, the head strap may be attached with the sides of the mounting frame 112. Once attached, the head strap may allow a user to wear the headset and view the VR content without having to hold the headset with his hands.

Figure 5C:
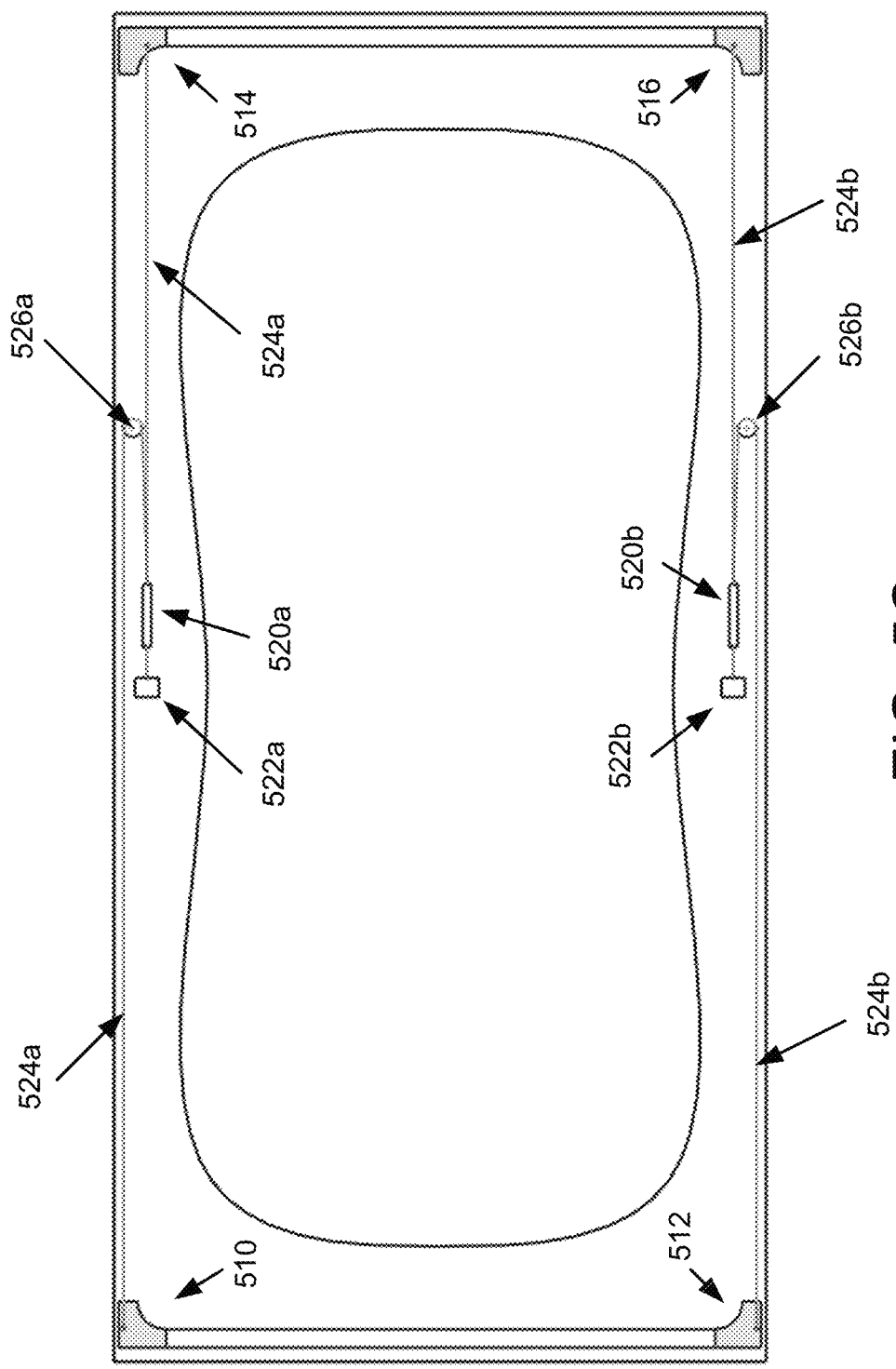

FIG. 5C shows another example attachment assembly by which a device can be attached with the headset. The attachment assembly may include self-centering tabs 510, 512, 514, and 516 located on the four corners of the mounting frame 112. Note that the mounting frame 112 is shown here from the display side 120. As depicted, each of the top corner tabs 510 and 514 is connected to a spring 520a associated with an anchor point 522a using a rope/cable 524a that pass through a pulley 526a. Similarly, each of the top corner tabs 512 and 516 is connected to a spring 520b associated with an anchor point 522b using a rope/cable 524b that pass through a pulley 526b. The attachment assembly as depicted allows the tabs 510, 512, 514, and 516 to extend outward in the plane of the mounting frame 112 to fit mobile devices having a range of dimensions. Each of the tabs extend outwards by an equal amount. For instance, when the tabs 510, 512, 514, and 516 are streched, the cables 524a and 524b pulls the strings 520a and 520b by the same amount so that the device is placed in a correct lateral position. In other words, using this cable and pulley system, the device may always be positioned symmetric to the headset.

Figure 5D:
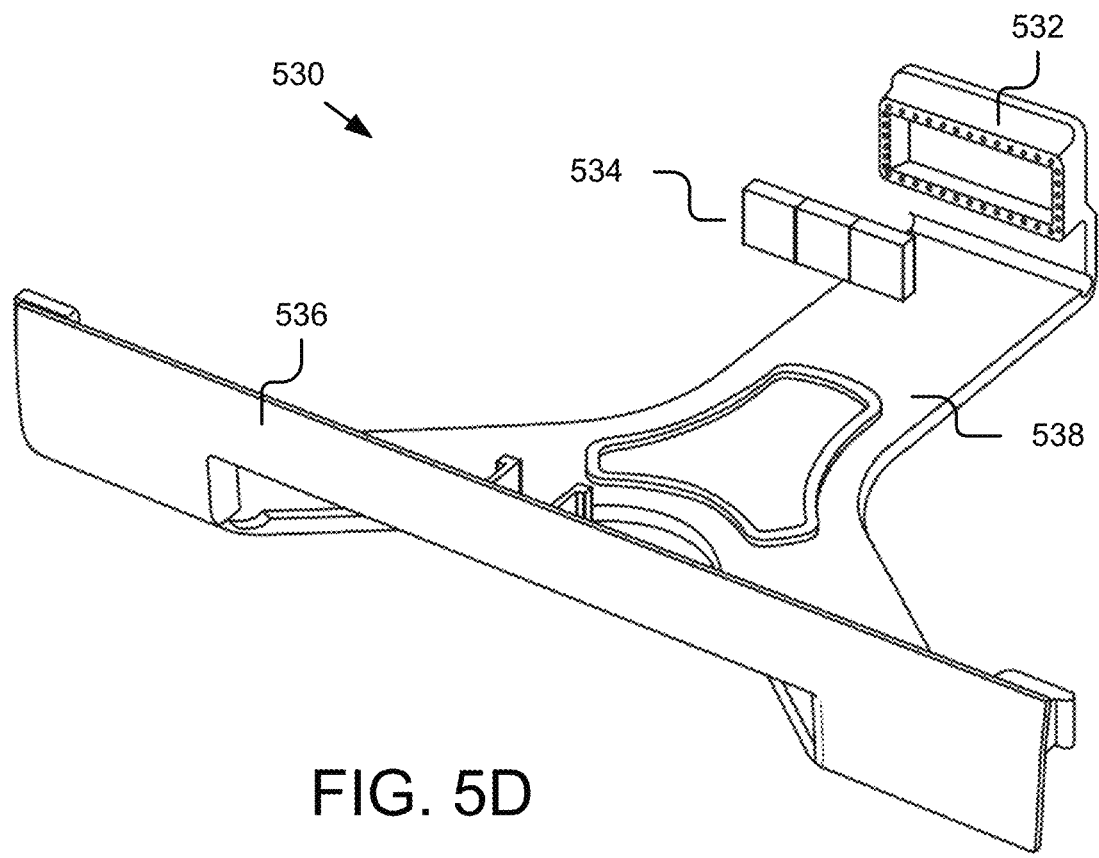
Figure 5E:
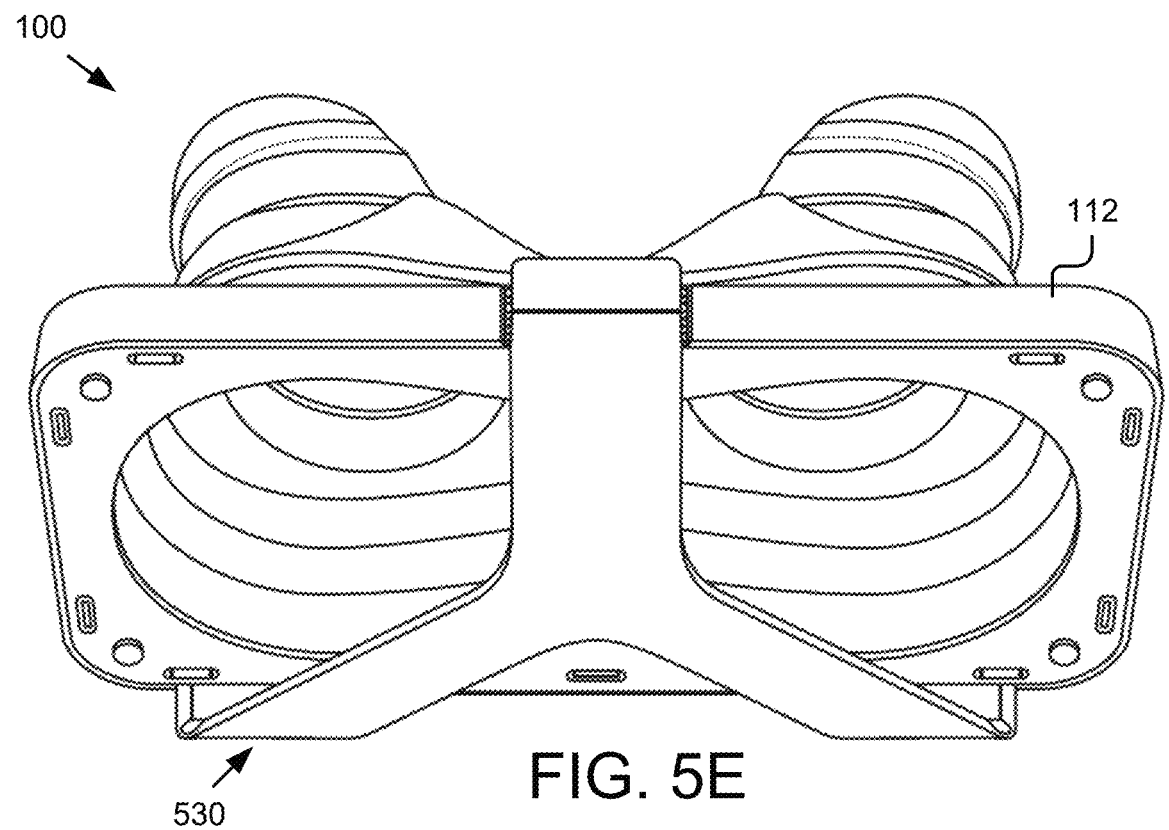

FIG. 5D shows yet another attachment mechanism by which a device can be attached with the headset 100. The attachment mechanism in this case includes a clip 530 comprising a top part 532 having a magnetic connector 534, a bottom part 536, and a back support 538. Although not shown, the bottom part 536 may also include one or more magnetic connectors. The clip 530 may be attached with the mounting frame 112 of the headset via the magnetic connectors of the clip. For example, the top part of the clip attaches with the top part of the mounting frame via the magnetic connector 534. FIG. 5E shows an example embodiment of the headset with the attached clip 530. A device may be fixated between the mounting frame 112 and the clip 530 and may be held by the back support 538 of the clip 530.

Figure 6A:
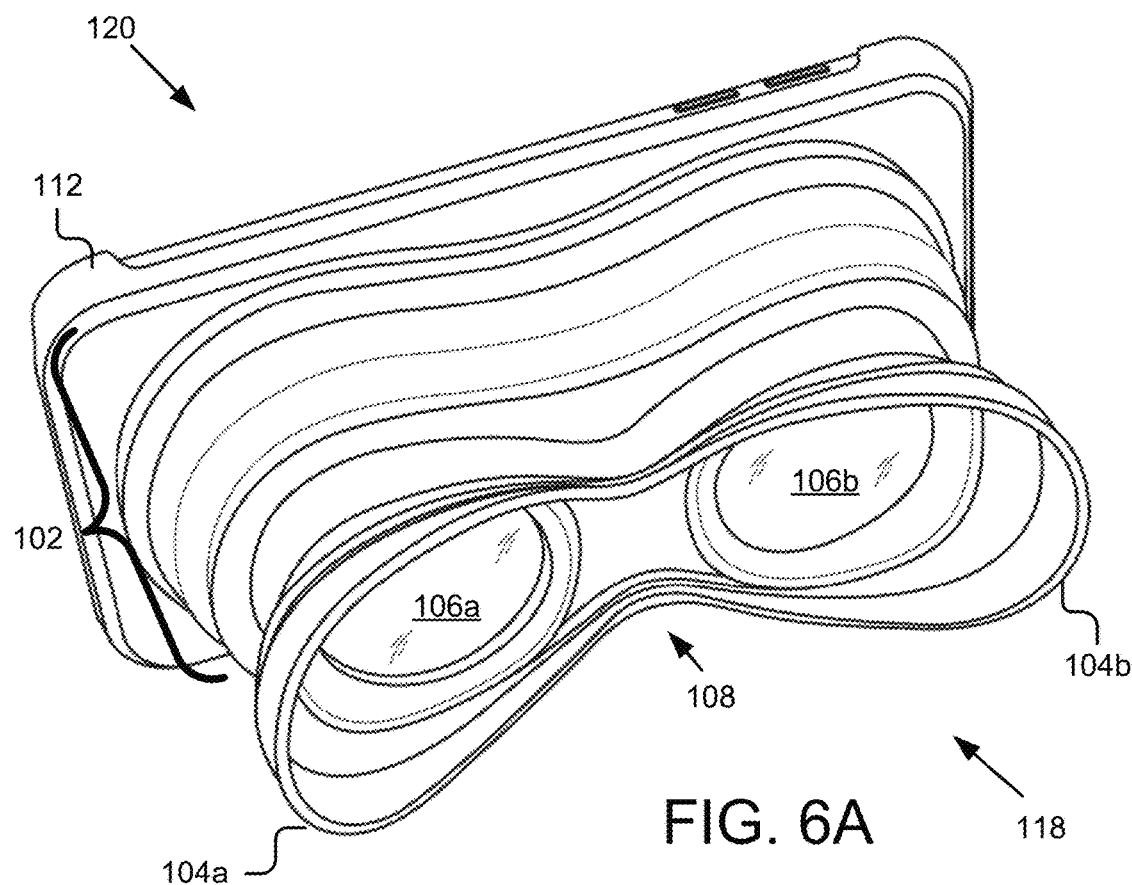
FIGS. 6A and 6B illustrate two example views of another example VR headset.
Figure 6B:
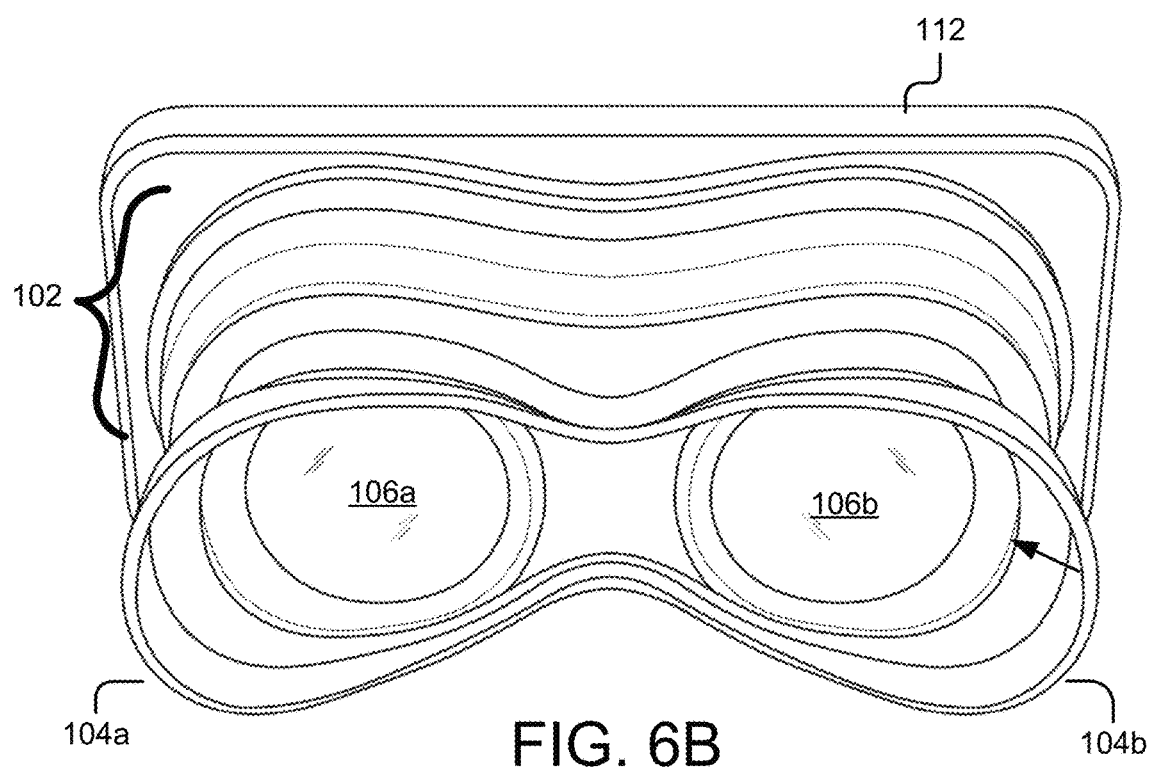

FIGS. 6A and 6B show another example embodiment of a VR headset. In particular, FIG. 6A is a perspective top view of the embodiment from a user-facing side 118. FIG. 6B is an angled view of the embodiment from the user-facing side 118. Note that same reference numerals are used to show elements that have already been discussed above (e.g., in reference to at least FIGS. 1A, 1B) and therefore the description of the elements will not be repeated here.

Figure 7:
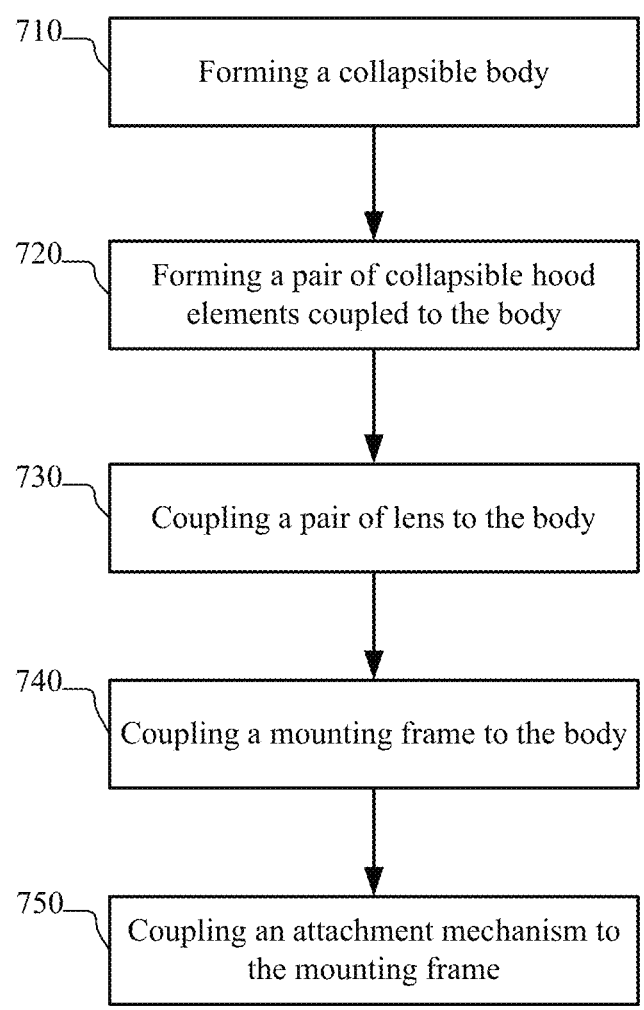
FIG. 7 illustrates an example method for forming the VR headset.

FIG. 7 illustrates an example method 700 for forming the VR headset 100. In step 710, the method 700 may form a collapsible body, such as the collapsible body 102. The method 700 may form the body by first forming multiple collapsible sections and then connecting these sections via a plurality of living hinges. The living hinges may be placed within two sections and help in collapsing a section into or onto another section, as discussed for example in reference to FIG. 1T. In particular embodiments, the collapsible body may be formed using a silicone material having a certain degree of rigidity. The base of the body may be made of a rigid plastic material. In some embodiments, the body structure may be made using an injection molding process.

In step 720, a pair of collapsible hood elements are formed and are coupled to the collapsible body. For instance, the pair of collapsible hood elements may be coupled to the outermost section of the body, as shown in FIG. 1T. The hood elements are formed such that each of the hood elements is separately collapsible. Also, the hood elements are collapsible independent of the body being collapsed. Furthermore, the body is itself collapsible independent of the hood elements being collapsed, as shown for example in FIG. 1R.

Each of the hood elements may collapse into or onto a perimeter of the body, as shown for example in at least FIGS. 1J, 1L, and 1N. In some embodiments, the hood elements may be made of a material distinct from the material used in forming the body. In some embodiments, the hood elements may also be made of silicone material but may have a degree of rigidity different from the degree of rigidity in the body. For example, the hood elements may be made of silicone material having a degree of rigidity higher than the one in the body. The vice-versa of this may also be possible and is within the scope of the present disclosure. In particular embodiments, even though different materials may be used for the body structure 102 and the hood elements 104 as discussed herein, the material making up the living hinges (and, in particular embodiments, the material around the living hinges) supporting the different sections of the body and the hood elements may be made of a consistently flexible material.

In step 730, a pair of lenses is coupled to the body. In particular embodiments, the method 700 may couple the lenses to the body by first forming a lens frame or holder for each lens and then embedding the lens holders within the body. The pair of lenses may couple to the body by inserting the lenses into their respective holders situated within the body. In some embodiments, the lens holders may be made using an injection molding process. For instance, the process may include injection molding the lens-holder(s) using a reasonably tough and stiff plastic. In some instances, the lens holders may then be placed within the body 102 by inserting the lens/holder assembly into the mold that forms the silicone material of the body. In some instances, the silicone may then be overmolded onto the lens/holder assembly (e.g., by performing step 710 after step 730). In some embodiments, the lens holders may be made of a rigid plastic material. In some instances, when forming the collapsible body in step 710, the method 700 may make portions of the body around the lens holders harder than remaining portions of the body. For example, a harder silicone material may be used in the body portions around the lenses and a softer silicone material may be used in the remaining body portions. Keeping the body material harder around the lenses may be essential for the placement and stability of the lenses within the body.

The injection molding process describe above is just one example of a process for manufacturing embodiments of the headset described herein, and this disclose contemplates any suitable manufacturing process. For example, an alternative process could. replace the frame with an equally thick or thicker equivalent silicone structure such that the molding process which generates the collapsible body also generates the frame. Certain moving parts, such as the tabs or self-centering tabs, could be inserted after the overmold is complete. In particular embodiments, a cover may be used to conceal internal moving parts. Particular embodiments may also or in the alternative use cover to provide a smooth surface on which to rest the phone. In particular embodiments, a mounting frame may be replaced with a thin flange. In particular embodiments, the mounting frame may be made out of silicone of a high stiffness, and overmolding as described above may be used, for example to give the impression of a seamless transition from the frame to the body.

In step 740, a mounting frame may be coupled to the body. The mounting frame may be a frame for supporting the body or a frame in which the body may at least be partially contained, as shown for example the mounting frame 112 in at least FIG. 1A, FIG. 1B, 1I-1R. The mounting frame may be made of hard plastic. The mounting frame may define a volume within which the hood elements, the lenses, and the body are at least partially contained when the body and hood elements are collapsed. In some embodiments, the mounting frame may be made using a molding process. For instance, the molding process that was used to generate the collapsible body structure 102 may also be used to generate the mounting frame. The frame can be made of a thick silicone structure. In some embodiments, the frame can be made out of silicone of a high stiffness and may be overmolded as discussed above.

In step 750, an attachment mechanism, in some embodiments, may optionally be coupled to the mounting frame. The attachment mechanism may include one of fixed tabs (e.g., FIG. 5A), side tabs/slots (e.g., FIG. 5B), self-centering tabs (e.g., FIG. 5C), and a clip (e.g., FIG. 5D) for phone attachment. The phone's display may be used to produce digital content (e.g., images, video, etc.) that are viewable through the pair of lenses to experience the content in a VR environment. In some embodiments, the attachment mechanism may further include components for attaching a head strap with the headset for hands-free operation of the headset. In some instances, an attachment mechanism discussed herein may be coupled by inserting the mechanism into the mold that may form the silicone material of the body. In other instances, the mechanism may be inserted after the overmolding process is complete as discussed above.

Figure 8:
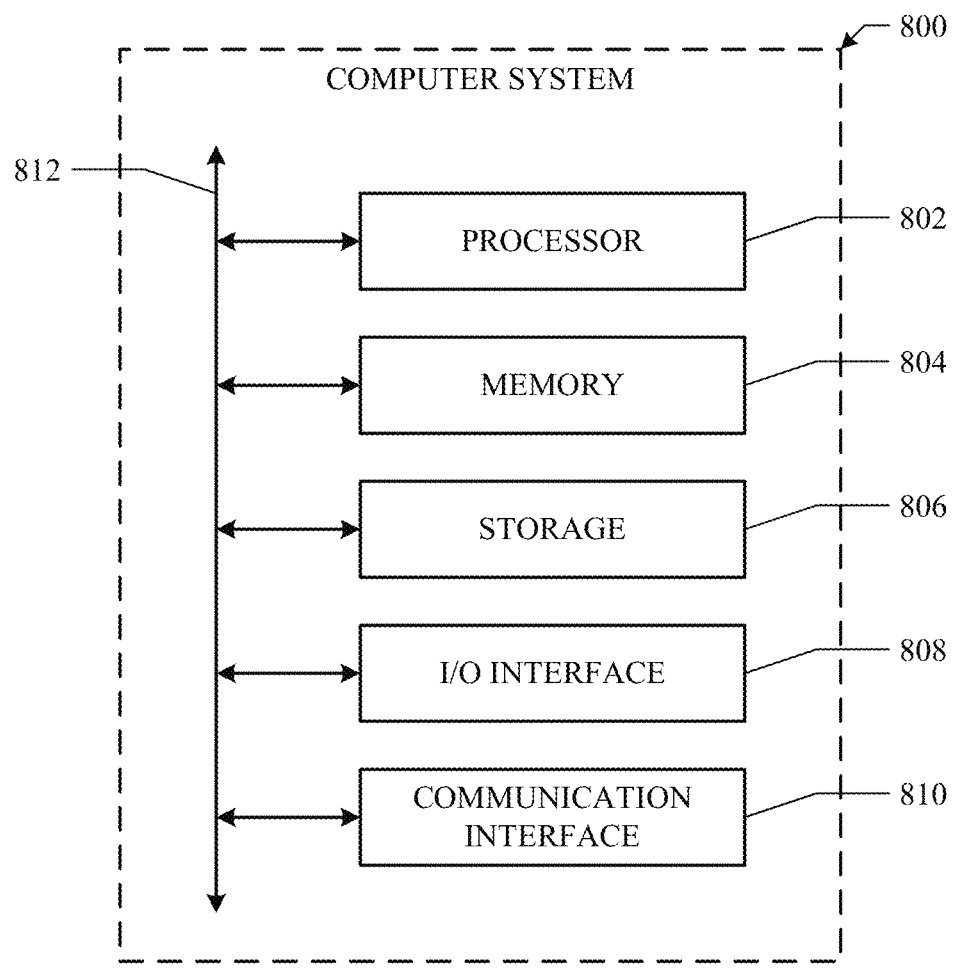
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPcGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus comprising:
a collapsible body comprising:
 a first body portion comprising a pair of lenses; and
 a collapsible second body portion coupled to the first body portion and to a collapsible third body portion; and
a pair of collapsible hood elements coupled to the first body portion, each of the hood elements being collapsible into or onto the first body portion,
 wherein:
 in a collapsed configuration, the hood elements are collapsed into or onto the first body portion, the first body portion is collapsed into the collapsible second body portion, the collapsible second body portion is collapsed into the collapsible third body portion, and the collapsible third body portion is collapsed; and in an uncollapsed configuration, the first body portion sits above the collapsible second body portion and the collapsible second body portion sits above the collapsible third body portion.

2. The apparatus of claim 1, wherein the body further comprises a plurality of reversible collapsible sections.

3. The apparatus of claim 2, wherein the sections are collapsible by a plurality of living hinges located between the sections.

4. The apparatus of claim 2, wherein the sections of the body collapse in a direction perpendicular to a plane of the lenses.

5. The apparatus of claim 2, wherein each of the sections overlap with one another when the body is collapsed.

6. The apparatus of claim 5, wherein the hood elements overlap with the sections of the body when the body and the hood elements are both collapsed.

7. The apparatus of claim 1, wherein each of the hood elements is collapsible independently of the other hood element.

8. The apparatus of claim 1, wherein the hood elements are collapsible independent of the body being collapsed.

9. The apparatus of claim 1, wherein the hood elements are collapsed into the body such that the hood elements are at least partially embedded in the body structure.

10. The apparatus of claim 1, wherein each of the collapsible hood elements comprises a living hinge configured to collapse the hood element onto a perimeter of the body.

11. The apparatus of claim 1, wherein:
a first part of the body comprises a silicone material having a first rigidity; and
a second part of the body comprises a silicone material having a second rigidity, wherein the second rigidity is greater than the first rigidity.

12. The apparatus of claim 11, wherein the second portion comprises area around the lenses and base of the body.

13. The apparatus of claim 2, wherein the apparatus further comprises:
a mounting frame, wherein the mounting frame defines a volume within which the hood elements, the lenses, and the body are at least partially contained when the body and hood elements are collapsed.

14. The apparatus of claim 13, wherein, when the body and the hood elements are collapsed, the largest width of the apparatus is equal to the width of the mounting frame.

15. The apparatus of claim 13, wherein, when the body and the hood elements are collapsed, a total thickness of the apparatus is equal to a thickness of the mounting frame.

16. The apparatus of claim 15, wherein, the total thickness of the apparatus is no greater than 15 mm.

17. The apparatus of claim 1, wherein a thickness of the combined body structure with the collapsed hood elements is equal to a thickness of the body.

18. The apparatus of claim 13, wherein:
the body further comprises:
a first section coupled to the mounting frame; and
a lens frame coupled to the first section, wherein the lens frame holds the pair of lenses; and
when each of the sections and the hood elements are collapsed:
the first section is contained within the mounting frame;
the hood elements are located between the first section and a portion of the lens frame; and
the lens frame is contained within the first section.

19. The apparatus of claim 1, wherein the apparatus further comprises an attachment mechanism configured to attach a mobile device to the apparatus so that a display of the mobile device is viewable through the lenses.

20. The apparatus of claim 19, wherein the body is coupled to a first end of a mounting frame and the attachment mechanism is coupled to a second end of the mounting frame opposite the first end.

21. The apparatus of claim 19, wherein the attachment mechanism comprises self-centering tabs such that a distance between the tabs is variable.

22. The apparatus of claim 19, wherein the attachment mechanism comprises fixed tabs such that a distance between the tabs is fixed.

23. The apparatus of claim 19, wherein the attachment mechanism comprises:
a plurality of magnetic connectors; and
a back support,
wherein the magnetic connectors attach with the top and bottom ends of the body, wherein the mobile device is fixated between the body and the attachment mechanism and is held by the back support.

24. The apparatus of claim 1, wherein the apparatus further comprises magnetic ends or connectors configured to attach a head strap to the apparatus.

25. The apparatus of claim 1, wherein the body further comprises a groove portion between the pair of lenses.

26. A method comprising:
forming a collapsible body comprising:
a first body portion comprising a pair of lenses; and
a collapsible second body portion coupled to the first body portion and to a collapsible third body portion;
forming a pair of collapsible hood elements coupled to the first body portion, each of the hood elements being collapsible into or onto the first body portion;
wherein:
the body and the collapsible hood elements are formed such that, in a collapsed configuration, the hood elements are collapsed into or onto the first body portion, the first body portion is collapsed into the collapsible second body portion, the collapsible second body portion is collapsed into the collapsible third body portion, and the collapsible third body portion is collapsed; and
in an uncollapsed configuration, the first body portion sits above the collapsible second body portion and the collapsible second body portion sits above the collapsible third body portion.

27. The method of claim 26, wherein forming the collapsible body comprises coupling a pair of lens to the body.

28. The method of claim 26, further comprising coupling a mounting frame to the body.

29. The method of claim 26, wherein forming the pair of collapsible hood elements coupled to the body comprises:
forming the pair of collapsible hood elements; and
coupling each of the collapsible hood elements to the body.

30. The method of claim 26, wherein forming the pair of collapsible hood elements coupled to the body comprises forming, out of a portion of a material coupled to the body, the pair of collapsible hood elements.

* * * * *